(12) United States Patent
Chen et al.

(10) Patent No.: US 11,766,660 B1
(45) Date of Patent: Sep. 26, 2023

(54) SYNTHESIS OF BIMETALLIC STRUCTURES FOR USE AS CATALYSTS

(71) Applicant: Honda Motor Co., Ltd., Tokyo (JP)

(72) Inventors: Shutang Chen, Livermore, CA (US); Gugang Chen, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 24 days.

(21) Appl. No.: 17/696,531

(22) Filed: Mar. 16, 2022

(51) Int. Cl.
*B01J 21/18* (2006.01)
*B01J 35/02* (2006.01)
*B01J 23/89* (2006.01)

(52) U.S. Cl.
CPC .............. *B01J 21/18* (2013.01); *B01J 23/892* (2013.01); *B01J 35/026* (2013.01)

(58) Field of Classification Search
CPC ........ B01J 21/18; B01J 23/892; B01J 35/026; C01P 2002/70; C01P 2002/74; C01P 2002/77; C01P 2002/85
USPC ................................ 502/339, 182, 184, 185
See application file for complete search history.

(56) References Cited

U.S. PATENT DOCUMENTS

| | | | | |
|---|---|---|---|---|
| 2015/0236355 A1* | 8/2015 | Yang | ................... | H01M 4/8657 429/405 |
| 2018/0281060 A1* | 10/2018 | Yang | ................... | B01J 35/0033 |
| 2018/0316023 A1* | 11/2018 | Fang | ................... | B01J 37/0072 |

FOREIGN PATENT DOCUMENTS

| | | | | |
|---|---|---|---|---|
| WO | WO-2012123435 A1 * | 9/2012 | .............. | B01J 13/02 |
| WO | WO-2016201041 A1 * | 12/2016 | ................ | B22F 1/02 |

OTHER PUBLICATIONS

K. Kodama, T. Nagai, A. Kuwaki, R. Jinnouchi, Y. Morimoto, "Challenges in applying highly active Pt-based nanostructured catalysts for oxygen reduction reactions to fuel cellvehicles", Nat. Nanotechnology, 2021, 16, 140-147.

X. X. Wang, M. T. Swihart, G. Wu, "Achievements, challenges and perspectives on cathode catalysts in proton exchange membrane fuel cells for transportation", Nat. Catalysis., 2019, 2, 578-589.

(Continued)

*Primary Examiner* — Patricia L. Hailey
(74) *Attorney, Agent, or Firm* — PATTERSON + SHERIDAN, LLP

(57) ABSTRACT

Aspects described herein generally relate to bimetallic structures, syntheses thereof, and uses thereof. In an embodiment, a process for forming a bimetallic nanoframe is provided. The process includes forming a first bimetallic structure by reacting a first precursor comprising platinum (Pt) and a second precursor comprising a Group 8-11 metal ($M^2$), wherein $M^2$ is free of Pt; reacting a third precursor comprising Pt with the first bimetallic structure to form a second bimetallic structure, the second bimetallic structure having a higher molar ratio of Pt to Group 8-11 metal than the first bimetallic structure; and introducing the second bimetallic structure with an acid to form the bimetallic nanoframe, the bimetallic nanoframe having a higher molar ratio of Pt to Group 8-11 metal than that of the second bimetallic structure, the bimetallic nanoframe having the formula: $(Pt)_a(M^2)_b$, wherein: a is the amount of Pt; b is the amount of $M^2$.

20 Claims, 9 Drawing Sheets

(56) References Cited

OTHER PUBLICATIONS

P. D. Luna, C. Hahn, D. Higgins, S. A. Jaffer, T. F. Jaramillo, E. H. Sargent, "What would it take for renewably powered electrosynthesis to displace petrochemical processes" Science, 2019, 364, eaav3506.

S. Zaman, L. Huang, A.I. Douka, H. Yang, B. You, B.Y. Xia, "Oxygen reduction reaction electrocatalysts toward practical fuel cells: progress and perspectives", Angewandte International Edition Chemie, 2021, 60, 17832-17852.

Q. Shao, P. Wang, T. Zhu, X. Huang, "Low dimensional platinum-based bimetallic nanostructures for advanced catalysis", Acc. Chem. Res., 2019, 52, 3383-3396.

Jiantao Fan, Ming Chen, Zhiliang Zhao, Zhen Zhang, Siyu Ye, Shaoyi Xu, Haijiang Wang, Hui Li, Bridging the gap between highly active oxygen reduction reaction catalysts and effective catalyst layers for proton exchange membrane fuel cells, Nature Energy, 2021, 6, 475-486.

C. Yang, et al. "Sulfur-anchoring synthesis of platinum intermetallic nanoparticle catalysts for fuel cell". Science, 2021, 374, 459-464.

X. Tian, et al. "Engineering bunched Pt-Ni alloy nanocages for efficient oxygen reduction in practical fuel cells". Science, 2019, 366, 850-856.

L. Chong, et al. "Ultralow-loading platinum-cobalt fuel cell catalysts derived from imidazolate frameworks". Science, 2018, 362, 1276-1281.

C. Chen, et al. "Highly crystalline multimetallic nanoframes with three-dimensional electrocatalytic surfaces". Science, 2014, 1339-1343.

M. Li, et al. "Ultrafine jagged platinum nanowires enable ultrahigh mass activity for the oxygen reduction reaction". Science, 2016, 354, 1414-1419.

X. Huang, et al. High-performance transition metal-doped $Pt_3Ni$ octahedra for oxygen reduction reaction. Science, 2015, 348, 1230-1234.

Kui Jiao, Jin Xuan, Qing Du, Zhiming Bao, Biao Xie, Bowen Wang, Yan Zhao, Linhao Fan, Huizhi Wang, Zhongjun Hou, Sen Huo, Nigel P. Brandon, Yan Yin, Michael D. Guiver, Designing the next generation of proton-exchange membrane fuel cells, Nature, 2021, 595, 361-369.

* cited by examiner

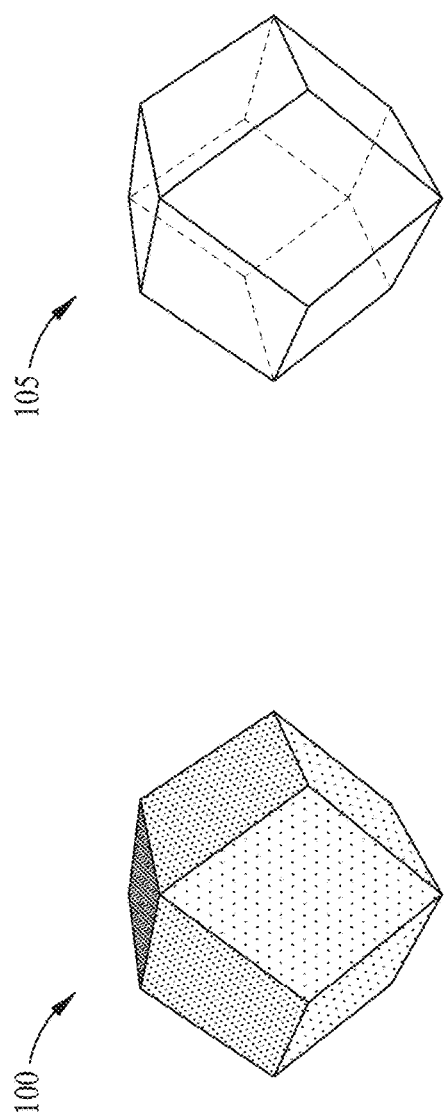
FIG. 1A
FIG. 1B
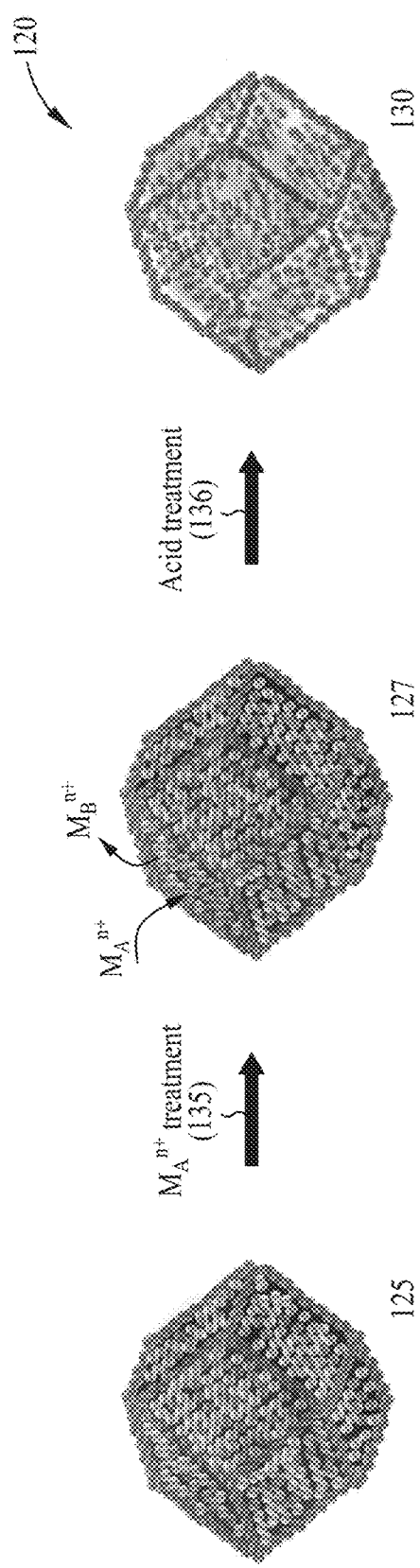
FIG. 1C

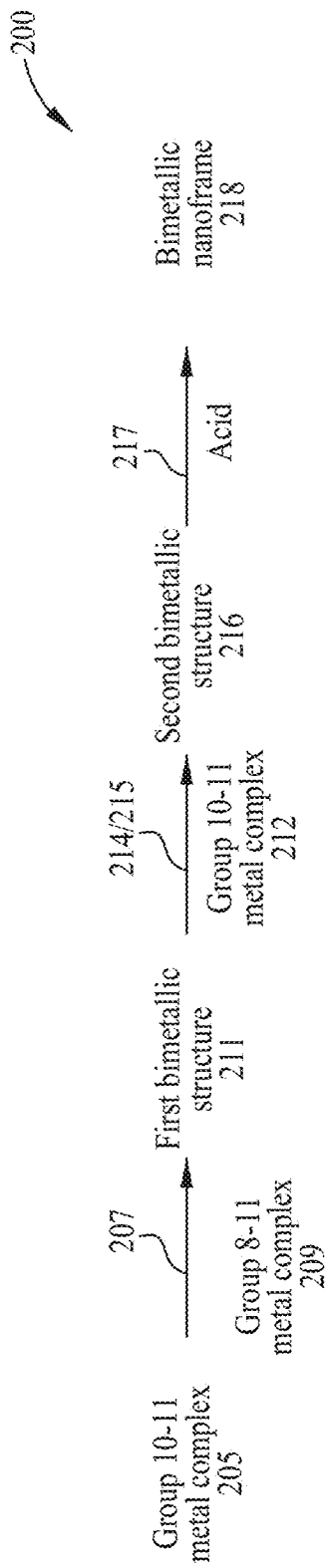
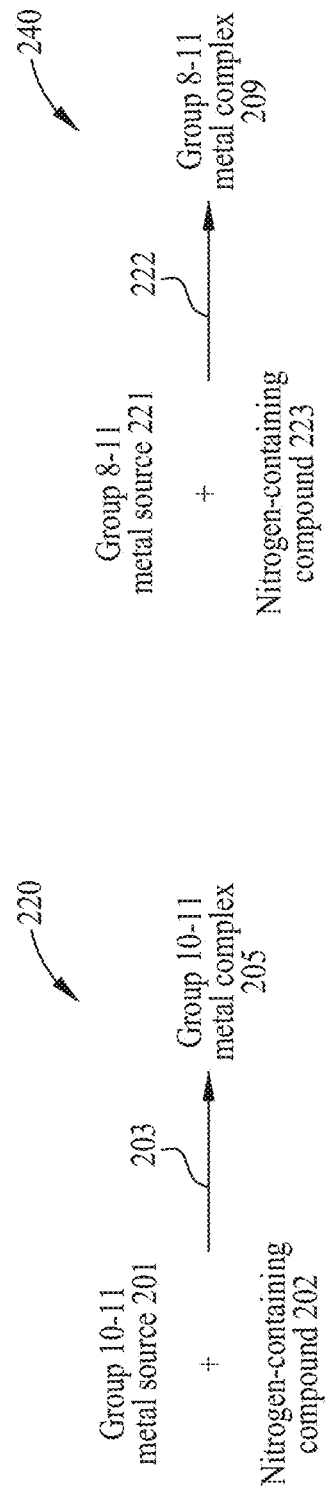
FIG. 2A
FIG. 2B
FIG. 2C

SYNTHESIS OF BIMETALLIC STRUCTURES FOR USE AS CATALYSTS

FIELD

Aspects of the present disclosure generally relate to bimetallic structures, syntheses thereof, and uses thereof.

BACKGROUND

Various metal catalysts are utilized in fuel cells to enhance the conversion of raw materials to energy via direct electrochemical oxygen reduction reactions and hydrogen evolution reactions. These metal catalysts are typically in the form of a metal nanostructure with high-index facets. The crystallographic properties of such facets are closely associated with the shape of the catalyst particle, which then influence the electrocatalytic function of the catalyst. Platinum is the most commonly used and effective catalyst for fuel cells, and specifically, for proton exchange membrane fuel cells (PEMFCs). However, the high cost and durability of conventional platinum catalysts limit its widespread adoption in fuel cells, PEMFCs, and other areas where large amounts of platinum are needed.

There is a need for new catalyst compositions that can be utilized as, for example, high performing alternatives to existing catalysts used in energy technology.

SUMMARY

Aspects of the present disclosure generally relate to bimetallic structures, syntheses thereof, and uses thereof.

In an aspect, a process for forming a bimetallic nanoframe is provided. The process includes forming a first bimetallic structure by reacting a first precursor and a second precursor, the first precursor comprising platinum (Pt), the second precursor comprising a Group 8-11 metal ($M^2$), wherein $M^2$ is free of Pt; reacting a third precursor comprising Pt with the first bimetallic structure at a temperature of about 80° C. to about 300° C. to form a second bimetallic structure, the second bimetallic structure having a higher molar ratio of Pt to Group 8-11 metal than that of the first bimetallic structure; and introducing the second bimetallic structure with an acid to form the bimetallic nanoframe, the bimetallic nanoframe having a higher molar ratio of Pt to Group 8-11 metal than that of the second bimetallic structure, the bimetallic nanoframe having the formula: $(Pt)_a(M^2)_b$, wherein: a is the amount of Pt; b is the amount of $M^2$; and a molar ratio of a:b is from about 99:1 to about 25:75.

In another aspect, a catalyst composition is provided. The catalyst composition includes a bimetallic polyhedral nanoframe, comprising: an interior that is at least partially hollow; and a plurality of facets encapsulating the interior, each facet of the plurality of facets comprising metal atoms, wherein the bimetallic polyhedral nanoframe has the formula: $(M^1)_a(M^2)_b$, wherein: $M^1$ is Pt; $M^2$ is a Group 8-11 metal comprising Fe, Ru, Os, Co, Rh, Ir, Ni, Pd, Cu, Ag, Au, or combinations thereof, and a molar ratio of a:b is from about 99:1 to about 25:75.

In another aspect, a process for forming a conversion product is provided. The process includes introducing a reactant to a bimetallic polyhedral nanoframe to form the conversion product, the bimetallic polyhedral nanoframe comprising: an interior that is at least partially hollow; and a plurality of facets encapsulating the interior, each facet of the plurality of facets comprising metal atoms, the bimetallic polyhedral nanoframe having the formula: $(M^1)_a(M^2)_b$, wherein: $M^1$ is Pt; $M^2$ is a Group 8-11 metal selected from the group consisting of Fe, Ru, Os, Co, Rh, Ir, Ni, Pd, Cu, Ag, Au, and combinations thereof, and a molar ratio of a:b is from about 99:1 to about 25:75.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, for the disclosure may admit to other equally effective aspects.

FIG. 1A is a non-limiting illustration of a nanocrystal according to at least one aspect of the present disclosure.

FIG. 1B is a non-limiting illustration of a hollow nanocrystal according to at least one aspect of the present disclosure.

FIG. 1C is an example reaction diagram for forming a bimetallic structure according to at least one aspect of the present disclosure.

FIG. 2A is an example reaction diagram for forming a bimetallic structure according to at least one aspect of the present disclosure.

FIG. 2B is an example reaction diagram for forming a Group 10-11 metal complex according to at least one aspect of the present disclosure.

FIG. 2C is an example reaction diagram for forming a Group 8-11 metal complex according to at least one aspect of the present disclosure.

DETAILED DESCRIPTION

Figure 3A:
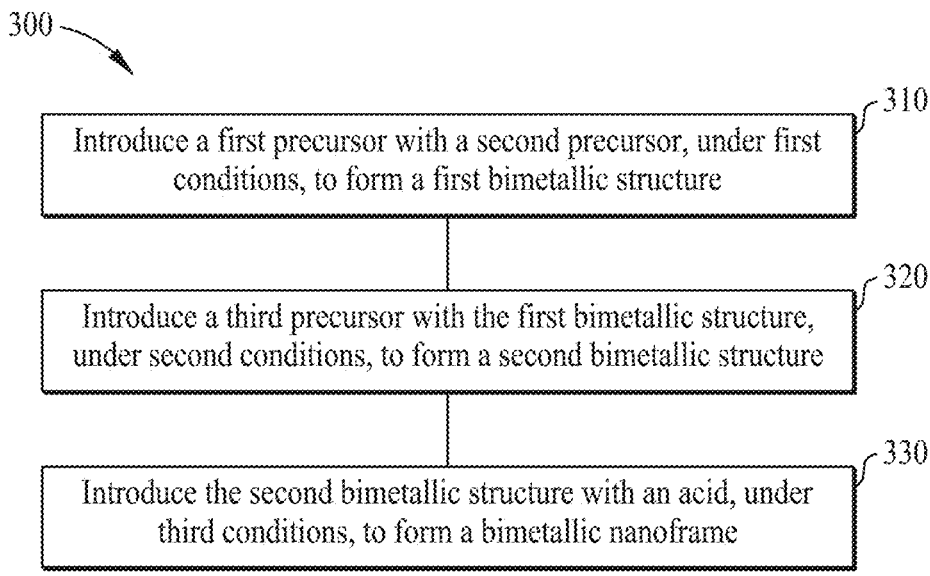
FIG. 3A is a flowchart showing selected operations of an example process for forming a bimetallic structure according to at least one aspect of the present disclosure.

Aspects of the present disclosure generally relate to bimetallic structures, syntheses thereof, and uses thereof. Briefly, the bimetallic structure that includes a Group 10-11 metal and a Group 8-11 metal of the periodic table of the elements, the Group 10-11 and Group 8-11 metals being the same or different. The Group 10-11 metal and the Group 8-11 metal can be in an alloy phase.

The bimetallic structure can be in the form of a nanocrystal, a nanoparticle, or combinations thereof, among other structures. The nanocrystal, nanoparticle, or other structure can be in the form of a nanoframe, a nanocage, or a structure that is at least partially hollow. Such nanoframes or structures being at least partially hollow can have a high density of catalytically-active sites and large specific surface areas. Due to these and other properties, lower catalyst loads can be achieved in various conversion reactions.

The inventors have also found processes for forming such bimetallic structures. Briefly, and in some examples, the process includes forming a first bimetallic structure by a wet chemical method. The first bimetallic structure can then be subjected to a metal ion treatment to form a second bimetallic structure. The second bimetallic structure can then be treated with acid to form a third bimetallic structure (for example, a nanoframe). The processes described herein can enable control over the morphology of the bimetallic structure, its chemical properties, and the number of active surface sites, among other chemical and physical characteristics. The bimetallic structures can be utilized as a catalyst in, for example, electrochemical oxygen reduction reactions and hydrogen evolution reactions, among other reactions. In such applications, the bimetallic structures can be integrated into a portion of, for example, a reactor, a fuel cell device such as a PEMFC device, or other devices useful for performing conversion reactions, among other applications.

Energy conversion and storage via, for example, direct electrochemical oxygen reduction reactions and hydrogen evolution reactions are among the most important energy technologies. Such reactions can be performed by devices known as fuel cells that convert the chemical energy of a fuel and an oxidizing agent into electricity through redox reactions. In particular, proton exchange membrane fuel cells (PEMFCs) are highly efficient chemical-to-electrical energy conversion devices that can be used as power sources in electric vehicles, including automobiles, buses, motorcycles, forklifts, watercraft such as submarines and boats, as well as portable and stationary applications.

To convert the chemical energy into electricity, fuel cells utilize various catalysts. The most commonly used catalysts to date in PEMFCs remain platinum-based catalysts such as platinum on carbon (Pt/C); however, the high cost and low durability of conventional platinum-based catalysts impede their practical use in fuel cells and other applications. Recent efforts toward reducing the amount of platinum in fuel cell catalysts have taken the form of Pt-based alloying nanocrystals. Conventional synthetic methods for making the Pt-based alloying nanocrystals typically utilize thermal and/or acid etching. Such conventional thermal and/or acid etching operations, however, reduce the surface area of the Pt-based alloying nanocrystals, thereby reducing both the durability and the catalytic activity (also known as the electrochemical surface active area (ECSA)) of the nanocrystals. Moreover, conventional synthesis methods are neither cost-efficient nor atom-economical.

Aspects described herein can overcome such deficiencies in the state-of-the-art. As further described below, the catalytic performance of the bimetallic nanostructures described herein far exceed those catalysts commercially available such as Pt/C. For example, and in some aspects, the bimetallic nanostructures described herein can have mass-specific activities that are about 19 times higher (or more) than commercial Pt/C electrocatalysts and about 6 times higher (or more) than the Department of Energy (DOE) target for electrocatalysts (DOE target: mass activity >0.44 A/mg(Pt) in PEMFCs). Moreover, the bimetallic nanostructures described herein show excellent durability. For example, after 30,000 cycles, the bimetallic nanostructures exceeded the DOE's durability target at 30,000 cycles (DOE target for durability of mass activity: <40% loss in initial activity at 0.9 V after 30,000 cycles in PEMFCs). Even after 50,000 cycles, the bimetallic nanostructures still exceeded the DOE's durability target. Moreover, processes described herein are more cost-effective and atom-economical than conventional technologies for making fuel cell catalysts. Further, processes described herein can be utilized to synthesize a variety of bimetallic nanostructures, such as platinum-nickel nanostructures, platinum-cobalt nanostructures, and platinum-iron nanostructures, among others.

Bimetallic Structures

Aspects of the present disclosure generally relate to bimetallic structures. The bimetallic structures can be in the form of nanostructures, nanoparticles, nanocrystals, nanocages, and/or nanoframes, though other structures as well as other sizes (for example, macro and micro) are contemplated. The bimetallic structures can be in the form of a composition or form at least a portion of a composition, for example, a catalyst composition. As further described below, the bimetallic structures can be useful for conversion reactions such as electrocatalytic conversion reactions. Illustrative, but non-limiting, examples of the electrocatalytic conversion reaction include oxygen reduction reaction (ORR), oxygen evolution reaction (OER), hydrogen evolution reaction (HER) such as the conversion of water into hydrogen, and the oxidation of alcohols.

The bimetallic structure generally includes two or more metals. The first metal is a Group 10-11 metal of the periodic table of the elements such as nickel (Ni), palladium (Pd), platinum (Pt), copper (Cu), silver (Ag), gold (Au), or combinations thereof, such as Ni, Cu, or combinations thereof. The second metal is a Group 8-11 metal of the periodic table of elements, such as iron (Fe), ruthenium (Ru), osmium (Os), cobalt (Co), rhodium (Rh), iridium (Ir), Ni, Pd, Pt, Cu, Ag, Au, or combinations thereof, such as Fe, Co, Ni, Pd, Pt, Cu, Ag, Au, or combinations thereof. The first metal (the Group 10-11 metal) is different from the second metal (the Group 8-11 metal).

The bimetallic structure can have the formula (IA):

$$(M^1)_a(M^2)_b \quad (IA),$$

wherein:
M$^1$ is a Group 10-11 metal of the periodic table of the elements, such as Ni, Cu, Pd, Pt, Ag, Au, or combinations thereof, such as Ni, Cu, or combinations thereof;
M$^2$ is a Group 8-11 metal of the periodic table of the elements, such as Fe, Ru, Os, Co, Rh, Ir, Ni, Pd, Pt, Cu, Ag, Au, or combinations thereof, such as Fe, Co, Ni, Pd, Pt, Cu, Ag, Au, or combinations thereof;
M$^1$ and M$^2$ are different metals;
a is the amount of M$^1$; and
b is the amount of M$^2$.

The molar ratio of a:b of the various bimetallic structures described herein can vary depending on the synthetic operation. As further described below, and in some aspects, a first bimetallic structure, having a first molar ratio of a:b, is formed by a wet chemical method. The first bimetallic structure can then be subjected to a metal ion treatment to form a second bimetallic structure, having a second molar ratio a:b. The second molar ratio a:b may be the same or different as the first molar ratio a:b. The second bimetallic structure can then be treated with acid to form a third bimetallic structure (for example, a nanoframe), having a third molar ratio a:b. The third molar ratio a:b can be the same or different from the first molar ratio and/or the second molar ratio.

In some aspects, the molar ratio of a:b of the first bimetallic structure having the formula (IA) can be from about 1:99 to about 99:1, such as from about 10:90 to about 90:10, such as from about 20:80 to about 80:20, such as from about 30:70 to about 70:30, such as from about 40:60 to about 60:40, such as from about 45:55 to about 55:45, such as from about 48:52 to about 52:48, such as about 50:50. In some aspects, a molar ratio of a:b can be from about 20:1 to about 1:20, such as from about 10:1 to about 1:10, such as from about 5:1 to about 1:5, such as from about 3:1 to about 1:3, such as from about 2:1 to about 1:2. In at least one aspect, a molar ratio of a:b is from about 1:99 to about 20:1, such as from about 5:95 to about 10:1, such as from about 10:90 to about 1:1, such as from about 30:70 to about 40:60.

In some aspects, the molar ratio of a:b of the second bimetallic structure having the formula (IA) can be from about 99:1 to about 20:80, such as from about 90:10 to about 30:60, such as from about 80:20 to about 30:70.

In some aspects, the molar ratio of a:b of the third bimetallic structure having the formula (IA) can be from about 99:1 to about 25:75, such as from about 90:10 to about 35:65, such as from about 75:25 to about 45:55.

For the bimetallic structure of formula (IA), the molar ratio of a:b of the first bimetallic structure, the second bimetallic structure, and the third bimetallic structure are determined by transmission electron microscopy of the bimetallic structure being analyzed. For processes of forming a bimetallic structure of formula (IA), the molar ratio of a:b of the first bimetallic structure, the second bimetallic structure, and the third bimetallic structure are determined based on the starting material molar ratio used for the synthesis.

In some aspects, the bimetallic structures described herein can also include one or more elements from Group 13-16 of the periodic table of the elements. The one or more elements from Group 13-16, such as carbon atoms, nitrogen atoms, phosphorous atoms, sulfur atoms, and/or oxygen atoms, can be in the form of ligand(s) and/or chelating group(s) bound to the Group 10-11 metal, the Group 8-11 metal, or both the Group 10-11 metal and the Group 8-11 metal. The ligand(s) and/or chelating group(s), when present, can be in the form of neutral species, monodentate species, bidentate species, and/or polydentate species. More than one ligand may be present in the composition. In cases where the bimetallic structure includes one or more elements from Group 13-16, the bimetallic structure can have the formula (IB):

$$(M^1)_a(M^2)_b(E)_c \quad (IB),$$

wherein:
M$^1$, M$^2$, a, and b are described above;
E is the Group 13-16 element, such as C, P, N, O, S, or combinations thereof, such as N, P, or combinations thereof; and
c is the amount of E.

In some aspects, a molar ratio of (a+b):c can be from about 1:1000 to about 1:10, such as from about 1:500 to about 1:100, such as from about 1:400 to about 1:200.

In some aspects, the molar ratio of a:b of the bimetallic structure of formula (IB) can be those described above with respect to formula (IA) and can vary depending on the synthetic operation. Similarly, the molar ratio of (a+b):c can vary depending on the synthetic operation.

In some aspects, when the bimetallic structure of formula (IB) includes nitrogen, the nitrogen originates from a nitrogen-containing compound utilized for the synthesis of the bimetallic structure. Such nitrogen-containing compounds include, for example, primary amines, secondary amines, tertiary amines, or combinations thereof. The nitrogen-containing compounds can include an unsubstituted hydrocarbyl or a substituted hydrocarbyl bonded to the nitrogen of the nitrogen-containing compound, where the unsubstituted hydrocarbyl or substituted hydrocarbyl can be saturated or unsaturated, linear or branched, cyclic or acyclic, aromatic or non-aromatic. The nitrogen-containing compound can be an amine having the formula (II):

$$NR^1R^2R^3 \qquad (II),$$

wherein:
each of $R^1$, $R^2$, or $R^3$ is, independently, hydrogen, unsubstituted hydrocarbyl, substituted hydrocarbyl, unsubstituted aryl, substituted aryl, or two or more of $R^1$, $R^2$, and/or $R^3$ may join together to form a substituted or unsubstituted, cyclic or polycyclic ring structure.

Unsubstituted hydrocarbyl includes $C_1$-$C_{100}$ unsubstituted hydrocarbyl, such as $C_2$-$C_{50}$ unsubstituted hydrocarbyl, such as $C_3$-$C_{30}$ unsubstituted hydrocarbyl, such as $C_5$-$C_{20}$ unsubstituted hydrocarbyl, such as $C_6$-$C_{16}$ unsubstituted hydrocarbyl. Substituted hydrocarbyl includes $C_1$-$C_{100}$ substituted hydrocarbyl, such as $C_2$-$C_{50}$ substituted hydrocarbyl, such as $C_3$-$C_{30}$ substituted hydrocarbyl, such as $C_5$-$C_{20}$ substituted hydrocarbyl, such as $C_6$-$C_{16}$ substituted hydrocarbyl. Unsubstituted aryl includes $C_4$-$C_{100}$ unsubstituted aryl, such as $C_4$-$C_{40}$ unsubstituted aryl, such as $C_4$-$C_{20}$ unsubstituted aryl, such as $C_4$-$C_{10}$ unsubstituted aryl. Substituted aryl includes $C_4$-$C_{100}$ substituted aryl, such as a $C_4$-$C_{40}$ substituted aryl, such as $C_4$-$C_{20}$ substituted aryl, such as $C_4$-$C_{10}$.

$R^1$, $R^2$, and/or $R^3$ can be, independently, saturated or unsaturated, linear or branched, cyclic or acyclic, aromatic or non-aromatic. When one or more of $R^1$, $R^2$, and/or $R^3$ is joined together, the formed structure may be substituted or unsubstituted, fully saturated, partially unsaturated, or fully unsaturated, aromatic or non-aromatic, cyclic or polycyclic.

Examples of hydrocarbyl include, but are not limited to, methyl, ethyl, n-propyl, isopropyl, n-butyl, isobutyl, tert-butyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, sec-decyl, n-undecyl, sec-undecyl, iso-undecyl, n-dodecyl, sec-dodecyl, isododecyl, n-tridecyl, sec-tridecyl, isotridecyl, n-tetradecyl, sec-tetradecyl, isotetradecyl, n-pentadecyl, sec-pentadecyl isopentadecyl, n-hexadecyl, sec-hexadecyl, isohexadecyl, n-heptadecyl, sec-heptadecyl, isoheptadecyl, n-octadecyl, sec-octadecyl, iso-octadecyl, n-nonadecyl, sec-nonadecyl, isononadecyl, n-eicosyl, sec-nonadecyl, isononadecyl, cyclopentyl, cyclohexyl, isomers thereof, derivatives thereof, or combinations thereof. Examples of aryl include, but are not limited to, phenyl, benzyl, polycyclic aromatics (such as naphthyl), isomers thereof, derivatives thereof, or combinations thereof.

Illustrative, but non-limiting, examples of nitrogen-containing compounds of formula (II) include oleylamine (OLA), octadecylamine (ODA), hexadecylamine (HDA), dodecylamine (DDA), tetradecylamine (TDA), isomers thereof, derivatives thereof, or combinations thereof. Other nitrogen-containing compounds are contemplated.

In some aspects, when the bimetallic structure of formula (IB) includes phosphorous, the phosphorous originates from a phosphorous-containing compound utilized for the synthesis of the bimetallic structure. Such phosphorous-containing compounds include phosphines having the formula (III):

$$PR^4R^5R^6 \qquad (III)$$

wherein:
each of $R^4$, $R^5$, and $R^6$ is, independently, hydrogen, unsubstituted hydrocarbyl, substituted hydrocarbyl, unsubstituted aryl, substituted aryl, or two or more of $R^4$, $R^5$, and/or $R^6$ may join together to form a substituted or unsubstituted, cyclic or polycyclic ring structure.

Unsubstituted hydrocarbyl includes $C_1$-$C_{100}$ unsubstituted hydrocarbyl, such as $C_2$-$C_{50}$ unsubstituted hydrocarbyl, such as $C_3$-$C_{30}$ unsubstituted hydrocarbyl, such as $C_5$-$C_{20}$ unsubstituted hydrocarbyl, such as $C_6$-$C_{16}$ unsubstituted hydrocarbyl. Substituted hydrocarbyl includes $C_1$-$C_{100}$ substituted hydrocarbyl, such as $C_2$-$C_{50}$ substituted hydrocarbyl, such as $C_3$-$C_{30}$ substituted hydrocarbyl, such as $C_5$-$C_{20}$ substituted hydrocarbyl, such as $C_6$-$C_{16}$ substituted hydrocarbyl. Unsubstituted aryl includes $C_4$-$C_{100}$ unsubstituted aryl, such as $C_4$-$C_{40}$ unsubstituted aryl, such as $C_4$-$C_{20}$ unsubstituted aryl, such as $C_4$-$C_{10}$ unsubstituted aryl. Substituted aryl includes $C_4$-$C_{100}$ substituted aryl, such as a $C_4$-$C_{40}$ substituted aryl, such as $C_4$-$C_{20}$ substituted aryl, such as $C_4$-$C_{10}$.

$R^4$, $R^5$, and/or $R^6$ can be, independently, saturated or unsaturated, linear or branched, cyclic or acyclic, aromatic or non-aromatic. When one or more of $R^4$, $R^5$, and/or $R^6$ is joined together, the formed structure may be substituted or unsubstituted, fully saturated, partially unsaturated, or fully unsaturated, aromatic or non-aromatic, cyclic or polycyclic. Examples of hydrocarbyl and aryl are described above.

In some aspects, when the bimetallic structure of formula (IB) includes sulfur, the sulfur originates from a sulfur-containing compound utilized for the synthesis of the bimetallic structure. Such sulfur-containing compounds include $C_1$-$C_{100}$ (such as $C_2$-$C_{50}$, such as $C_3$-$C_{30}$, such as $C_5$-$C_{20}$, such as $C_6$-$C_{16}$) hydrocarbyls substituted with at least one sulfur atom. The sulfur-containing compounds can be saturated or unsaturated, linear or branched, cyclic or acyclic, aromatic or non-aromatic.

In at least one aspect, the bimetallic structure of formula (IB) includes oxygen. The oxygen originates from an oxygen-containing compound utilized for the synthesis of the bimetallic structure. Such oxygen-containing compounds include $C_1$-$C_{100}$ (such as $C_2$-$C_{50}$, such as $C_3$-$C_{30}$, such as $C_5$-$C_{20}$, such as $C_6$-$C_{16}$) hydrocarbyls substituted with at least one oxygen atom. The oxygen-containing compounds can be saturated or unsaturated, linear or branched, cyclic or acyclic, aromatic or non-aromatic. A non-limiting example of oxygen containing compounds includes fatty acids.

For the bimetallic structure of formula (IB), the molar ratio of a:b and the molar ratio of (a+b):c of the first bimetallic structure, the second bimetallic structure, and the third bimetallic structure are determined by transmission electron microscopy of the bimetallic structure being analyzed. For processes of forming a bimetallic structure of formula (IB), the molar ratio of a:b and the molar ratio of (a+b):c of the first bimetallic structure, the second bimetallic structure, and the third bimetallic structure are determined based on the starting material molar ratio used for the synthesis.

Aspects of the bimetallic structures described herein can be in the form of a homogeneous structure such as an alloy structure, as well as a heterogeneous structure such as a core-shell structure, and/or a heterostructure. Other structures include intermetallic structures, partial alloys, complexes, compounds, and coordination compounds. Each of these different types of bimetallic structures can have different physical performance capabilities.

FIG. 1A is an illustration of a dodecahedral nanocrystal 100. Bimetallic structures described herein can take such a form. It is contemplated that the bimetallic structure can have other three-dimensional shapes (for example, polyhedra, such as rhombic, cubic, cuboctahedral, etc.) with any suitable number of faces. FIG. 1B is an exemplary, non-limiting, illustration of a hollow, or at least partially hollow, dodecahedral nanocrystal 105. The bimetallic structures described herein can take the form of such hollow, substantially hollow, or partially hollow nanocrystals. When the bimetallic structures are at least partially hollow, substantially hollow, or hollow, the nanocrystals can be known as nanoframes.

A nanoframe is a nanostructured material that includes a plurality of interconnected struts arranged to form the edges of a polyhedron, defining a partially hollow, substantially hollow, or hollow interior volume. The overall surface area to volume ratio (surface-to-volume ratio) of nanoframes is greater than that of an identically shaped polyhedral particle having solid interior volume. Nanoframes are unique for their three-dimensional, highly open architecture. Nanoframes can be characterized as having disordered, defective, or otherwise irregular morphologies. The bimetallic nanoframes described herein can be attractive for use as catalysts because of, for example, their high density of catalytically-active sites and large specific surface areas. The high number of catalytically-active sites and large specific surface areas of the hollow nanocrystals relative to nanocrystals, is due to, for example, the aforementioned defects. Due to such properties, lower catalyst loads can be achieved in various conversion reactions.

The bimetallic structures described herein can have a suitable concentration of "defects". A "defect" refers to vacancies, stacking faults, grain boundary, edge dislocation, or other defects of the bimetallic structures described herein. The defect(s) can promote catalytic activity of the bimetallic structure by, for example, increasing the active sites and/or surface area where catalytic reactions can be performed. The surface defects of the bimetallic structure can be observed by high resolution transmission electron microscopy (HR-TEM).

The bimetallic structures described herein can have an average particle size from about 5 nm to about 2000 µm, such as from about from 50 nm to 200 µm, such as from about from 50 nm to 20 µm, such as from about from 500 nm to 2 µm. For polyhedral particles (for example, bimetallic structures described herein), the average particle size is an equivalent edge length as measured by TEM. In some examples, the average particle size (nm) can be 5, 10, 15, 20, 25, 30, 35, 40, 45, 50, 55, 60, 65, 70, 75, 80, 85, 90, 95, or 100, though higher or lower average particle sizes are contemplated. Each of the foregoing numbers can be preceded by the word "about," "at least about," "less than about," or "more than about," and any of the foregoing numbers can be used singly to describe an open-ended range or in combination to describe a close-ended range. For example, the average particle size can be about 5 nm or more, from about 15 nm to about 95 nm, or less than about 50 nm.

In some examples, the average particle size can be from about 10 nm to about 400 nm, such as from about 25 nm to about 375 nm, such as from about 50 nm to about 350 nm, such as from about 75 nm to about 325 nm, such as from about 100 nm to about 300 nm, such as from about 125 nm to about 275 nm, such as from about 150 nm to about 250 nm, such as from about 175 nm to about 225 nm, such as from about 175 nm to about 200 nm or from about 200 nm to about 225 nm. Other average particle sizes are contemplated.

The bimetallic structures described herein can have an average edge length (nm) that is 1, 3, 5, 10, 20, 30, 40, 50, 60, 70, 80, 90, 100, 150, 200, 250, 300, 350, 400, 450, 500, 550, 600, 650, 700, 750, 800, 850, 900, 950, or 1000, though higher or lower average edge lengths are contemplated. Each of the foregoing numbers can be preceded by the word "about," "at least about," "less than about," or "more than about," and any of the foregoing numbers can be used singly to describe an open-ended range or in combination to describe a close-ended range. For example, the average edge length can be at least 3 nm, from about 50 nm to about 800 nm, less than about 100 nm. In some examples, the average edge length is from about 100 nm to about 600 nm, such as from about 150 nm to about 400 nm, such as from about 200 nm to about 300 nm. In at least one example, the average edge length is from about 3 nm to about 40 nm, such as from about 5 nm to about 30 nm, such as from about 10 nm to about 20 nm. Other average edge lengths are contemplated. The average edge length is determined by TEM.

The bimetallic structures described herein can have an average edge thickness (nm) that is 1, 2, 3, 4, 5, 10, 15, 20, 25, 30, 35, 40, 45, 50, 55, 60, 65, 70, 75, 80, 85, 90, 95, or 100, though higher or lower average edge thicknesses are contemplated. Each of the foregoing numbers can be preceded by the word "about," "at least about," "less than about," or "more than about," and any of the foregoing numbers can be used singly to describe an open-ended range or in combination to describe a close-ended range. For example, the average thickness is at least about 2 nm, from about 20 nm to about 60 nm, or less than about 10 nm. In some examples, the average edge length is from about 5 nm to about 100 nm, such as from about 10 nm to about 80 nm, such as from about 20 nm to about 60 nm, such as from about 30 nm to about 50 nm, such as from about 35 nm to about 45 nm. In at least one aspect, the average edge thickness is less than about 5 nm, such as less than about 4 nm, such as less than about 3 nm, such as less than about 2 nm, such as less than about 1 nm. Other average edge thicknesses are contemplated. The average edge thickness is determined by TEM.

The bimetallic structure can be in the form of a core-shell structure where, for example, both the Group 10-11 metal and the Group 8-11 metal are in both the core and the shell. In some examples, the Group 10-11 metal can be mainly distributed around the edge region (or in the shell) of the core-shell structure and the Group 8-11 metal can be mainly in the core of the core-shell structure as determined by elemental mapping using energy dispersive spectroscopy. In some examples, the Group 10-11 metal can be mainly in the core of the core-shell structure and the Group 8-11 metal can be mainly distributed around the edge region (or in the shell) of the core-shell structure as determined by elemental mapping using energy dispersive spectroscopy.

The bimetallic structure can have a variety of polyhedral structures such as cubic, tetrahedral, octahedral, rhombic dodecahedral, decahedral, icosahedral, triangular prism, hexagonal prism, cuboctahedral, rod-shaped, bar-shaped, wire-shaped (or tube-like), or combinations thereof, as determined by X-ray diffraction. Other polyhedral structures are contemplated. Similarly, when the bimetallic structure is in the form of a nanoframe, the nanoframe can have a variety of polyhedral structures. In some aspects, the polyhedral nanoframe is a face-centered cubic nanoframe, a cubic nanoframe, a tetrahedral nanoframe, an octahedral nanoframe, a rhombic dodecahedral nanoframe, a decahedral nanoframe, an icosahedral nanoframe, a triangular prism nanoframe, a hexagonal prism nanoframe, a cuboctahedral nanoframe, a rod-shaped nanoframe, a bar-shaped nanoframe, a wire-shaped (or tube-like) nanoframe, or combinations thereof, as determined by X-ray diffraction. Other polyhedral nanoframe structures are contemplated.

For purposes of the present disclosure, the terms "polyhedral nanoframe" and "bimetallic polyhedral nanoframe" are used interchangeably such that reference to one includes reference to the other. For example, reference to "polyhedral nanoframe" includes reference to both "polyhedral nanoframe" and "bimetallic polyhedral nanoframe."

The polyhedral nanoframes can be characterized as having an interior encapsulated by a plurality of facets such as bimetallic nanoframe 130 of FIG. 1C further described below. The interior can be a partially hollow interior, a substantially hollow interior, or a hollow interior. The polyhedral nanoframe can also have small pores in or among some or all of the facets. In some aspects, the small pores can allow small molecules to enter and reside in the interior or on the inner surface of the polyhedral nanoframe so both the exterior surface and interior surface of the nanoframe can provide a catalytic surface. Each of the facets can be made of a plurality of metal atoms. The facets can be solid or can be porous, having small pores that allow small molecules to pass between the outside of the nanoframe and the at least partially hollow interior.

The facets can include a metal atom from Group 10-11 and/or Group 8-11, such as those metals described above, such as Fe, Ru, Os, Co, Rh, Ir, Ni, Pd, Pt, Cu, Ag, Au, or combinations thereof. In some aspects, the facets include only a single type of metal atom, for example, Pt. In other aspects, two or more different types of metal atoms are included in the facets. In some aspects, one or more of the metals can be atoms from the metal core used in the synthesis of the polyhedral nanoframe. In some aspects, the facets include about 50%, 55%, 60%, 65%, 70%, 75%, 80%, 85%, 90%, 95%, or 100% of a single type of metal atom, though other amounts are contemplated. Each of the foregoing numbers can be preceded by the word "about," "at least about," "less than about," or "more than about," and any of the foregoing numbers can be used singly to describe an open-ended range or in combination to describe a close-ended range. As a non-limiting example, the facets comprise Pt atoms, where about 50% or more of the metal atoms of the facets are Pt atoms, such as about 60% to about 95% metal atoms, or about 85% or more metal atoms. The amount of metal atoms of the facets and nanoframes are determined by inductively coupled plasma-mass spectrometry (ICP-MS).

The polyhedral nanoframe can have any suitable number of facets. The number of faces can be about 4 faces or more, such as from about 4 facets to about 50 facets, such as from about 8 facets to about 40 facets, such as from about 12 facets to about 30 facets, such as from about 18 facets to about 20 facets. In some aspects, the number of facets can be 4, 8, 12, 15, 18, 20, 24, 30, 40, or 50 facets, though a higher or lower number of facets are contemplated. Each of the foregoing numbers can be preceded by the word "about," "at least about," "less than about," or "more than about," and any of the foregoing numbers can be used singly to describe an open-ended range or in combination to describe a close-ended range. Alternatively, and in some aspects, the polyhedral nanoframe can have 4, 5, 6, 7, 8, 9, 10, 11, 12, 13, 14, 15, 16, 17, 18, 19, or 20 facets or more. Each of the foregoing numbers can be preceded by the word "about," "at least about," "less than about," or "more than about," and any of the foregoing numbers can be used singly to describe an open-ended range or in combination to describe a close-ended range. For example, the number of facets can be about 4, more than about 8, or from about 8 to about 20. Other numbers of facets are contemplated.

As discussed above, the bimetallic structures can be at least at least partially hollow, substantially hollow, or hollow as determined by electron microscopy (such as high-angle annular dark-field scanning transmission electron microscopy, HAADF-STEM) due to their different contrast. The bimetallic structure can be characterized as a nanoframe as determined by electron microscopy (such as HAADF-STEM). Although aspects detailed herein are related to nanoscale materials (such as nanoparticles, nanocrystals, and nanoframes), larger or smaller structures are contemplated such as microparticles, macroparticles, microcrystals, macrocrystals, microframes, and/or macroframes.

In some aspects, the bimetallic structure has an X-ray diffraction pattern showing peaks at {111}, {200}, {220}, and/or {311}. The bimetallic structures can be face-centered cubic, though other morphologies are contemplated.

The bimetallic structure can be characterized as having a mass activity (in units of A/mg(Pt)) of 0.4, 0.44, 0.5, 1, 1.5, 2, 3, 3.5, 4, 4.5, 5, 5.5, 6, 6.5, 7, 7.5, 8, 8.5, 9, 9.5, or 10, though higher or lower mass activities are contemplated. When the metal is not Pt, the units are A/mg(metal). Each of the foregoing numbers can be preceded by the word "about," "at least about," "less than about," or "more than about," and any of the foregoing numbers can be used singly to describe an open-ended range or in combination to describe a close-ended range. For example, the mass activity (in units of A/mg(Pt)) can be about 0.44, at least about 0.5, or from about 1 to about 9. The mass activity is determined at 0.9V with a reference to a reversible hydrogen electrode ($V_{RHE}$) as described in the Examples.

The bimetallic structure can be characterized as having a percent loss of mass activity (in units of percent, %) after 30,000 cycles of 0, 1, 2, 3, 4, 5, 6, 7, 8, 9, 10, 15, 20, 25, 30, 35, or 40, though higher or lower mass activities are contemplated. Each of the foregoing numbers can be preceded by the word "about," "at least about," "less than about," or "more than about," and any of the foregoing numbers can be used singly to describe an open-ended range or in combination to describe a close-ended range. For example, the percent loss of mass activity can be about 40% or less, about 30% or less, or from about 1% to about 10%. The percent loss of mass activity is determined by the following equation:

$$(\text{mass activity}_{final} - \text{mass activity}_{initial})/(\text{mass activity}_{initial}) \times 100$$

where mass activity$_{initial}$ is the initial mass activity of the bimetallic structure, mass activity$_{final}$ is the mass activity after 30,000 cycles. Each of the mass activity$_{initial}$ and mass activity$_{final}$ are determined at 0.9V with a reference to a reversible hydrogen electrode ($V_{RHE}$) as described in the Examples.

In some aspects, the bimetallic structure can be in the form of a monolayer film or a film including multiple layers, such as about 10 or fewer layers, such as about 5 or fewer layers. Additionally, or alternatively, the bimetallic structure is in the form of particles.

In at least one aspect, the bimetallic structure can facilitate conversion reactions. In some aspects, one or more bimetallic structures can be at least a portion of a catalyst composition. The catalyst composition can facilitate conversion reactions.

Processes

The present disclosure also relates to processes for forming a bimetallic structure, such as a bimetallic nanoframe. Non-limiting properties of the bimetallic structure are described above. FIG. 1C shows a general reaction diagram 120 for forming bimetallic nanoframe 130 according to at least one aspect of the present disclosure. In this non-limiting illustration, a first bimetallic structure 125 includes a Group 10-11 metal ($M_A$) and a Group 8-11 metal ($M_B$) at a first molar ratio $M_A$ to $M_B$. The first bimetallic structure 125, such as a polyhedral nanoparticle such as a Pt—Ni polyhedral nanoparticle, is reacted with a Group 10-11 metal complex that includes a metal, $M_A$, under conditions to form a second bimetallic structure 127 via operation 135. This reaction, or operation 135, is also referred to as a metal ion treatment. As a result of the metal ion treatment, the second bimetallic structure 127 can have a higher concentration of metal $M_A$ than the first bimetallic structure 125, a lower concentration of metal $M_B$ than the first bimetallic structure 125, as well as a higher molar ratio of $M_A$ to $M_B$ than the first bimetallic structure 125. The second bimetallic structure 127 is then subjected to an acid treatment 136. The acid treatment converts the second bimetallic structure 127 to a third bimetallic structure (for example, a bimetallic nanoframe 130). The bimetallic nanoframe 130 has a partially hollow, substantially hollow, or hollow interior. As a result of the acid treatment, the bimetallic nanoframe 130 can have a higher concentration of metal $M_A$ than the second bimetallic structure 127 and/or the first bimetallic structure 125, a lower concentration of metal $M_B$ than the second bimetallic structure 127 and/or the first bimetallic structure 125, as well as a higher molar ratio of $M_A$ to $M_B$ than the second bimetallic structure 127 and/or the first bimetallic structure 125.

FIGS. 2A, 2B, and 2C show reaction diagrams 200, 220, and 240, respectively, illustrating selected operations for forming a bimetallic structure. The bimetallic structure can be at least partially hollow, substantially hollow, or hollow and/or characterized as a nanoframe, such as those described above. FIG. 3A is a flowchart showing selected operations of a process 300 for forming a bimetallic structure according to at least one aspect of the present disclosure.

The process 300 includes introducing a first precursor with a second precursor under first conditions 207 effective to form a first bimetallic structure 211. The first precursor includes a Group 10-11 metal and may be in the form of a Group 10-11 metal complex 205. The second precursor includes a Group 8-11 metal and may be in the form of a Group 8-11 metal complex 209.

Referring to FIG. 2B, the Group 10-11 metal complex 205 of the first precursor can be made by introducing a Group 10-11 metal source 201 with a nitrogen-containing compound 202 under conditions 203 effective to form the Group 10-11 metal complex 205. The Group 10-11 metal complex 205 can be, for example, a metal amine such as a platinum amine. The Group 10-11 metal source 201 includes a Group 10-11 metal, for example, Ni, Pd, Pt, Cu, Ag, Au, or combinations thereof. The Group 10-11 metal source 201 can further include one or more ligands such as halide (for example, $I^-$, $Br^-$, $Cl^-$, or $F^-$), acetylacetonate ($O_2C_5H_7^-$), hydride ($H^-$), $SCN^-$, $NO_2^-$, $NO_3^-$, $N_3^-$, $OH^-$, oxalate ($C_2O_4^{2-}$), $H_2O$, acetate ($CH_3COO^-$), $O_2^-$, $CN^-$, $OCN^-$, $OCN^-$, $CNO^-$, $NH_2^-$, $NH^{2-}$, $NC^-$, $NCS^-$, $N(CN)_2^-$, pyridine (py), ethylenediamine (en), 2,2'-bipyridine (bipy), $PPh_3$, or combinations thereof. In some aspects, the Group 10-11 metal of the Group 10-11 metal source 201 includes platinum, copper, and/or another Group 10-11 metal. Illustrative, but non-limiting, examples of the Group 10-11 metal source 201 include platinum halides, platinum acetates, platinum nitrates, other suitable platinum species, copper acetates, copper halides, copper nitrates, and/or other suitable copper species. Hydrates are also contemplated. Examples Group 10-11 metal source 201 include, but are not limited to, hexachloroplatinic acid (or hydrates thereof, for example, $H_2PtCl_6 \cdot 6H_2O$), platinum chloride ($PtCl_4$), potassium platinum(II) chloride ($K_2PtCl_4$), platinum(II) acetate (Pt($CH_3CO_2$)$_2$), platinum(IV) acetate (Pt($CH_3CO_2$)$_4$), sodium hexachloroplatinate hexahydrate ($Na_2PtCl_6 \cdot 6H_2O$), and platinum(II) acetylacetonate (Pt($C_5H_7O_2$)$_2$), The nitrogen-containing compound 202 can be those described above for formula (II), though other nitrogen-containing compounds are contemplated. Illustrative, but non-limiting, examples of the nitrogen-containing compound 202 include OLA, ODA, HDA, DDA, TDA, or combinations thereof. The nitrogen-containing compound 202 can also be utilized as a solvent. When desired, a solvent such as octadecene, phenyl ether, benzyl ether, or combinations thereof can additionally, or alternatively, be used. In some examples, the molar ratio of Group 10-11 metal source 201 to nitrogen-containing compound 202 is 1:1000, 1:900, 1:800, 1:700, 1:600, 1:500, 1:400, 1:300, 1:200, 1:100, 1:90, 1:80, 1:70, 1:60, 1:50, 1:40, 1:30, 1:20, 1:10, 1:5, 1:3, 1:2, or 1:1, though higher or lower molar ratios are contemplated. Each of the foregoing numbers can be preceded by the word "about," "at least about," "less than about," or "more than about," and any of the foregoing numbers can be used singly to describe an open-ended range or in combination to describe a close-ended range. For example, the molar ratio of Group 10-11 metal source 201 to nitrogen-containing compound 202 is about 1:10, more than about 1:50 (for example, 1:1), or from about 1:20 to about 1:10. In some examples, the molar ratio of Group 10-11 metal source 201 to nitrogen-containing compound 202 is from about 1:1000 to about 1:1, such as from about 1:500 to about 1:1, such as from about 1:100 to about 1:1, such as from about 1:50 to about 1:1 based on the starting material molar ratio used for the reaction. In some aspects, the molar ratio of copper source to nitrogen-containing compound is from about 1:20 to about 1:1, such as from about 1:10 to about 1:1, such as from about 1:4 to about 1:1, such as from about 1:2 to about 1:1. The molar ratio of Group 10-11 metal source 201 to nitrogen-containing compound 202 is based on the starting material molar ratio used for the reaction.

Conditions 203 effective to form the Group 10-11 metal complex 205 (for example, the metal amine such as the platinum amine) can include a reaction temperature and a reaction time. The reaction temperature to form the Group 10-11 metal complex 205 can be greater than about 40° C., such as greater than about 60° C., such as greater than about 80° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240° C., such as from about 190° C. to about 230° C., such as from about 200° C. to about 220° C. In some aspects, the reaction temperature to form the Group 10-11 metal complex 205 can be from about 150° C. to about 250° C. or from about 180° C. to about 240° C. Higher or lower temperatures can be used when appropriate. The reaction time to form the Group 10-11 metal complex 205 can be about 1 minute (min) or more or about 24 h or less, such as from about 1 min to about 12 h, such as from about 5 min to about 6 hours (h), such as from about 10 min to about 5.5 h, such as from about 15 min to about 5 h, such as from about 30 min to about 4 h, such as from about 45 min to about 3 h, such as from about 1 h to about 2 h. The reaction time to form the Group 10-11 metal complex 205 can be more or less depending on, for example, the level of conversion desired. Any reasonable pressure can be used during formation of the Group 10-11 metal complex 205.

Conditions 203 effective to form the Group 10-11 metal complex 205 (for example, the copper amine or nickel amine) can include stirring, mixing, and/or agitation. Conditions 203 can optionally include utilizing a non-reactive gas, such as $N_2$ and/or Ar. For example, a mixture of the Group 10-11 metal source 201 and the nitrogen-containing compound 202 can be placed under these or other non-reactive gases to degas various components or otherwise remove oxygen from the reaction mixture.

In some aspects, the Group 10-11 metal complex 205 can be kept in the form of a stock solution/suspension for use in operation 310. In other aspects, the reaction product comprising the Group 10-11 metal complex 205 can be subjected to filtration, separation, cleaning, quenching, washing, purification, and/or other suitable processes to remove undesired components and isolate the Group 10-11 metal complex 205 from the other components of the reaction mixture. For example, the reaction product comprising the Group 10-11 metal complex 205 (which may be in the form of particles) can be centrifuged to separate the Group 10-11 metal complex 205 from the mixture. Additionally, or alternatively, the Group 10-11 metal complex 205 can be washed with polar solvent(s), such as water, acetone, ethanol, methanol, or combinations thereof, and/or non-polar solvent(s), such as hexane, pentane, toluene, or combinations thereof. Other solvents for washing can include ether solvents such as diethyl ether and tetrahydrofuran; chlorocarbon solvents such as dichloromethane and chloroform; as well as ethyl acetate, dimethylformamide, acetonitrile, benzene, isopropanol, n-butanol, n-propanol. Mixtures of two or more of these solvents, in suitable proportions, can be utilized for washing, purifying, or otherwise separating the Group 10-11 metal complex 205 from other components in the reaction mixture. As an example, a solvent or a mixture of solvents can be added to the Group 10-11 metal complex 205 and the resultant mixture centrifuged. The supernatant can be discarded and the remaining pellet can be dispersed in a suitable solvent or mixture of solvents. The resultant pellet and solvent(s) can then be centrifuged to obtain the Group 10-11 metal complex 205. In these and other aspects, the pellet comprising the Group 10-11 metal complex 205 can be re-solubilized or re-suspended in a nitrogen-containing compound such as those described above.

Referring to FIG. 2C, the Group 8-11 metal complex 209 of the second precursor can be formed by introducing a Group 8-11 metal source 221 with a nitrogen-containing compound 223 under conditions 222 effective to form the Group 8-11 metal complex 209. The nitrogen-containing compound 223 can be the same or different than the nitrogen-containing compound 202. The Group 8-11 metal source 221 includes a Group 8-11 metal of the periodic table of the elements, such as Fe, Ru, Os, Co, Rh, Ir, Ni, Pd, Pt, Cu, Ag, Au, or combinations thereof, such as Fe, Co, Ni, Pd, Pt, Cu, Ag, Au, or combinations thereof. The Group 8-11 metal source 221 can further include one or more ligands such as halide ($I^-$, $Br^-$, $Cl^-$, or $F^-$), acetylacetonate ($O_2C_5H_7^-$), hydride (H), $SCN^-$, $NO_2^-$, $NO_3^-$, $N_3^-$, $OH^-$, oxalate ($C_2O_4^{2-}$), $H_2O$, acetate ($CH_3COO^-$), $O_2^-$, $CN^-$, $OCN^-$, $OCN^-$, $CNO^-$, $NH_2^-$, $NH^{2-}$, $NC^-$, $NCS^-$, $N(CN)_2^-$, pyridine (py), ethylenediamine (en), 2,2'-bipyridine (bipy), $PPh_3$, or combinations thereof. In some aspects, the Group 8-11 metal source 221 includes metal acetates, metal acetalacetonates, metal halides, metal nitrates, and/or other Group 8-11 metal species. Illustrative, but non-limiting, examples of the Group 8-11 metal source 221 include nickel(II) acetylacetonate, nickel(II) nitrate, nickel(II) chloride, cobalt (II) acetylacetonate, iron(II) acetylacetonate, hydrates thereof, and combinations thereof. Examples of the Group 8-11 metal source 221 can also include Au, Ag, and Pd having the same or similar ligands, and combinations thereof. Hydrates of one or more of the aforementioned materials are also contemplated.

Conditions 222 effective to form the Group 8-11 metal complex 209 (for example, the Group 8-11 metal amine) of the third precursor can include similar conditions for forming the Group 10-11 metal complex 205 described above with respect to conditions 203.

Referring back to FIG. 2A, the Group 10-11 metal complex 205 and the Group 8-11 metal complex 209 are introduced, under first conditions 207, to form the first bimetallic structure 211 at operation 310. For operation 310, the molar ratio of the first precursor (for example, the Group 10-11 metal complex 205) to second precursor (for example, the Group 8-11 metal complex 209) can be adjusted as desired. In some examples, the molar ratio of the Group 10-11 metal complex 205 to the Group 8-11 metal complex 209 is 100:1, 90:1, 80:1, 70:1, 60:1, 50:1, 40:1, 30:1, 20:1, 10:1, 5:1, 3:1, 2:1, 1:1, 1:2, 1:3, 1:5, 1:10, 1:20, 1:30, 1:40, 1:50, 1:60, 1:70, 1:80, 1:90, or 1:100, though other molar ratios are contemplated. Each of the foregoing numbers can be preceded by the word "about," "at least about," "less than about," or "more than about," and any of the foregoing numbers can be used singly to describe an open-ended range or in combination to describe a close-ended range. For example, the molar ratio the Group 10-11 metal complex 205 to the Group 8-11 metal complex 209 is about 5:1, from about 10:1 to about 2:1, or at least about 1:1. In some examples, the molar ratio of the Group 10-11 metal complex 205 to the Group 8-11 metal complex 209 is from about 100:1 to about 1:100, such as from about 50:1 to about 1:50, such as from about 20:1 to about 1:20, such as from about 10:1 to about 1:10, such as from about 5:1 to about 1:5, such as from about 3:1 to about 1:3, such as about 1:1 or from about such as from about 1:1 to about 1:2. The molar ratio is determined based on the starting material molar ratio used for the reaction.

The first conditions 207 of operation 310 can include an operating temperature and a duration of time. The operating temperature (° C.) of operation 310 can be 50, 75, 100, 125, 150, 175, 200, 225, 250, 275, 300, 325, 350, 375, 400, though higher or lower temperatures are contemplated. Each of the foregoing numbers can be preceded by the word "about," "at least about," "less than about," or "more than about," and any of the foregoing numbers can be used singly to describe an open-ended range or in combination to describe a close-ended range. For example, the temperature can be about 400° C. or less, about 150° C. to about 275° C., or more than about 150° C. In some aspects, the operating temperature of operation 310 is about 400° C. or less, such as from about 50° C. to about 400° C., such as from about 75° C. to about 375° C., such as from about 100° C. to about 350° C., such as from about 125° C. to about 325° C., such as from about 150° C. to about 300° C., such as from about 175° C. to about 275° C., such as from about 200° C. to about 250° C., such as from about 200° C. to about 225° C. In some aspects, the operating temperature of operation 310 can be set to a temperature of about 100° C. to about 150° C. or from about 180° C. to about 320° C. In some aspects, a combination of two or more temperatures can be utilized. The time for forming the first bimetallic structure 211 (for example, the first conditions 207) of operation 310 can be about 1 min or more or about 24 h or less, such as from about 5 min to about 6 h, such as from about 10 min to about 1 h, though greater or lesser periods of time are contemplated. Operation 310 can include stirring, mixing, and/or agitating the mixture to ensure, for example, homogeneity of the mixture. Operation 310 can be performed using a non-reactive gas (such as $N_2$ and/or Ar) to remove or substantially remove oxygen from the mixing environment. Suitable operating pressures can be utilized for operation 310. In some aspects, and prior to introducing the first precursor with the second precursor, the second precursor can be mixed with a solvent. The solvent can be, or include, a nitrogen-containing compound, such as those described above. Additionally, or alternatively, other suitable solvents can be used.

As such, the first bimetallic structure 211 is formed. This first bimetallic structure 211 can be a bimetallic nanoparticle such as a bimetallic polyhedral nanoparticle.

The first bimetallic structure 211 formed from operation 310 is then introduced with a third precursor, under second conditions 214/215, to form a second bimetallic structure 216 at operation 320. Operation 320 is a metal ion treatment where the third precursor, for example, a Group 10-11 metal complex 212, is reacted with the first bimetallic structure. The resulting second bimetallic structure 216 can have a higher concentration of Group 10-11 metal than that of the first bimetallic structure 211, a lower concentration of Group 8-11 metal than that of the first bimetallic structure 211. The second bimetallic structure 216 can also have a higher molar ratio of the Group 10-11 metal to Group 8-11 metal than that of the first bimetallic structure 211.

The Group 10-11 metal complex 212 of the third precursor can be made by introducing a Group 10-11 metal source with a nitrogen containing compound. The Group 10-11 metal complex 212 can be made in the same or similar manner as that described above for Group 10-11 metal complex 205, though other methods are contemplated. The Group 10-11 metal complex 212 can be the same as, or different from, the Group 10-11 metal complex 205.

For operation 320, amounts of the Group 10-11 metal complex 212 of the third precursor can be adjusted relative to the first bimetallic structure 211. For example, the molar ratio (based on the starting material molar ratio used for the reaction) of the first bimetallic structure 211 to the Group 10-11 metal complex 212 can be 500:1, 400:1, 200:1, 100:1, 50:1, 20:1, 10:1, 5:1, 3:1, 2:1, 1:1, 1:2, 1:3, 1:5, 1:10, 1:20, 1:50, 1:100, 1:200, 1:400, or 1:500, though other molar ratios are contemplated. Each of the foregoing numbers can be preceded by the word "about," "at least about," "less than about," or "more than about," and any of the foregoing numbers can be used singly to describe an open-ended range or in combination to describe a close-ended range. For example, the molar ratio of the first bimetallic structure 211 to the Group 10-11 metal complex 212 can be less than about 500:1, greater than about 1:1, or from about 10:1 to about 1:10 based on the starting material molar ratio used for the reaction. In some aspects, the molar ratio of the first bimetallic structure 211 to the Group 10-11 metal complex 212 can be from about 200:1 to about 1:100, such as from about 150:1 to about 1:150, such as from about 100:1 to about 1:100 based on the starting material molar ratio used for the reaction. In some aspects, the molar ratio of the first bimetallic structure 211 to the Group 10-11 metal complex 212 can be from about 1:50 to about 1:2, such as from about 1:20 to about 1:5, such as from about 1:10 to about 1:8. The molar ratio of the first bimetallic structure 211 to the Group 10-11 metal complex 212 is determined based on the starting material molar ratio used for the reaction.

When desired, a solvent such as octadecene, diphenyl ether, biphenyl, benzyl ether, phenyl ether, or combinations thereof can be used for operation 320. Additionally, or alternatively, the solvent, when used, can include a nitrogen-containing compound such as OLA, ODA, HDA, DDA, TDA, or combinations thereof. For example, the first bimetallic structure 211 and/or the third precursor comprising the Group 10-11 metal complex 212 can be dispersed in a solvent.

The second conditions of operation 320 can include introduction conditions 214 and reaction conditions 215 of FIG. 2A. The introduction conditions 214 refer to the conditions at which the third precursor comprising the Group 10-11 metal complex 212 is introduced to the first bimetallic structure 211 and optional solvent by injection, addition, or otherwise combining the third precursor with the first bimetallic structure 211. The reaction conditions 215 refer to the conditions at which the third precursor comprising the Group 10-11 metal complex 212 and the first bimetallic structure 211 are reacted. The introductions conditions 214 and reaction conditions 215 can be the same or different.

The introduction conditions 214 include an introduction temperature. The introduction temperature (° C.), or injection temperature, of operation 320 can be 50, 75, 100, 125, 150, 175, 200, 225, 250, 275, 300, 325, 350, 375, 400, though higher or lower temperatures are contemplated. Each of the foregoing numbers can be preceded by the word "about," "at least about," "less than about," or "more than about," and any of the foregoing numbers can be used singly to describe an open-ended range or in combination to describe a close-ended range. For example, the temperature for introduction conditions 214 can be about 100° C. or more, 300° C. or less, or from about 125° C. to about 275° C. In some examples, the introduction temperature for introduction conditions 214 can be about 400° C. or less, such as from about 50° C. to about 400° C., such as from about 75° C. to about 375° C., such as from about 80° C. to about 340° C., such as from about 90° C. to about 330° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240° C., such as from about 190° C. to about 230° C., such as from about 200° C. to about 220° C. In some aspects, the introduction temperature for introduction conditions 214 can be from about 80° C. to about 320° C., such as from about 80° C. to about 150° C. or from about 180° C. to about 320° C., such as from about 200° C. to about 300° C. Higher or lower introduction/injection temperatures can be used when appropriate.

The resultant mixture containing the first bimetallic structure 211, the Group 10-11 metal complex 212, and the optional solvent, can be stirred, mixed or otherwise agitated at the introduction temperature for a time period of about 1 min or more or about 24 h or less, such as from about 1 min to about 12 h, such as from about 5 min to about 6 h, such as from about 10 min to about 3 h, such as from about 15 min to about 1 h. The introduction conditions 214 of operation 320 can optionally include introducing $N_2$, Ar, and/or other non-reactive gases prior to, during, and/or after, introducing the third precursor comprising the Group 10-11 metal complex 212 to the first bimetallic structure 211.

After introduction of the Group 10-11 metal complex 212 to the first bimetallic structure 211, one or more components of the resultant mixture react, under reaction conditions 215, to form the first bimetallic structure 211. Here, the reaction conditions 215 of operation 320 can include heating the mixture containing the first bimetallic structure 211, the Group 10-11 metal complex 212, and the optional solvent, at a reaction temperature (° C.) of 50, 75, 100, 110, 120, 125, 130, 140, 150, 160, 170, 175, 180, 190, 200, 210, 220, 225, 230, 240, 250, 260, 270, 275, 280, 290, 300, 310, 320, 325, 330, 340, 350, 360, 370, 375, 380, 390, or 400, though higher or lower temperatures are contemplated. Each of the foregoing numbers can be preceded by the word "about," "at least about," "less than about," or "more than about," and any of the foregoing numbers can be used singly to describe an open-ended range or in combination to describe a close-ended range. For example, the reaction temperature of reaction conditions 215 can be about 125° C. or more, 300° C. or less, or about 160° C. In some aspects, the reaction temperature of reaction conditions 215 is about 400° C. or less, such as from about 50° C. to about 400° C., such as from about 75° C. to about 375° C., such as from about 80° C. to about 340° C., such as from about 90° C. to about 330° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240° C., such as from about 190° C. to about 230° C., such as from about 200° C. to about 220° C. In some aspects, the reaction temperature of reaction conditions 215 can be from about 80° C. to about 320° C., such as from about 80° C. to about 150° C. or from about 180° C. to about 320° C., such as from about 200° C. to about 300° C. Higher or lower temperatures can be used when appropriate. The reaction conditions 215 of operation 320 can include a time of about 1 min or more or about 24 or less, such as from about 1 min to about 12 h, such as from about 5 min to about 3 h, such as from about 10 min to about 1 h. Higher or lower temperatures and/or more or less periods of time can be used when appropriate. Stirring, mixing, and/or agitation can be performed to, for example, ensure homogeneity. The reaction conditions 215 of operation 320 can include introducing $N_2$, Ar, and/or other non-reactive gases before, during, and/or after reaction of the one or more components.

In some examples, the reaction conditions 215 include an operating temperature that is higher than, less than, or equal to the temperature of the introduction conditions 214.

After a suitable time, the reaction product mixture comprising the second bimetallic structure 216 formed during operation 320 can be subjected to filtration, separation, cleaning, quenching, washing, purification, and/or other suitable processes to remove undesired components and isolate the second bimetallic structure 216 from the other components of the reaction product mixture. For example, the reaction product mixture comprising the second bimetallic structure 216 can be centrifuged to separate the second bimetallic structure 216 (which may be in the form of particles) from the reaction product mixture. Additionally, or alternatively, the second bimetallic structure 216 can be washed with polar solvent(s), such as water, acetone, ethanol, methanol, or combinations thereof, and/or non-polar solvent(s), such as hexane, pentane, toluene, or combinations thereof. Other solvents for washing can include ether solvents such as diethyl ether and tetrahydrofuran; chlorocarbon solvents such as dichloromethane and chloroform; as well as ethyl acetate, dimethylformamide, acetonitrile, benzene, isopropanol, n-butanol, n-propanol. Mixtures of two or more of these solvents, in suitable proportions, can be utilized for washing, purifying, or otherwise separating the second bimetallic structure 216 from other components in the reaction product mixture. As an example, a solvent or mixture of solvents can be added to the second bimetallic structure 216 and the resultant mixture centrifuged. The supernatant can be discarded and the remaining pellet can be dispersed in a suitable solvent or mixture of solvents. The resultant pellet and solvent(s) can then be centrifuged to obtain the second bimetallic structure 216.

As a non-limiting example of operation 320, a bimetallic polyhedral nanoparticle (for example, first bimetallic structure 211), with or without a solvent, can be degassed using a non-reactive gas while agitating, and heated to introduction conditions of about 60° C. to about 120° C. A platinum amine (such as the Group 10-11 metal complex 212) is then added. The resultant mixture is then stirred for a suitable period of time, under suitable pressures, with or without the presence of a non-reactive gas. At a selected time point, the mixture of the bimetallic polyhedral nanoparticle, the platinum amine, and optional solvent are placed under the reaction conditions of about 120° C. to about 250° C. The mixture can be stirred under suitable pressures, and with or without the presence of a non-reactive gas, to form the second bimetallic structure 216. The second bimetallic structure 216 can then be subjected to filtration, separation, cleaning, quenching, washing, purification, and/or other suitable processes to remove undesired components and/or isolate the second bimetallic structure 216 from the other components of the reaction mixture.

Process 300 further includes converting, under third conditions, the second bimetallic structure 216 to a third bimetallic structure (such as the bimetallic nanoframe 218) at operation 330. Operation 330 is typically an acid treatment or etching process where the second bimetallic structure 216 is introduced to an acid to form the third bimetallic structure. By subjecting the second bimetallic structure 216 to an acid or etching treatment, the third bimetallic structure becomes at least partially hollow. The third bimetallic structure has a partially hollow, substantially hollow, or hollow interior. Chemical and physical properties of the third bimetallic structure, for example, the bimetallic nanoframe 218, are also described above. In FIG. 2A, the third conditions are designated by numeral 217.

Conditions 217 effective to form the third bimetallic structure can include etching with an etching agent. Etching can include subjecting the second bimetallic structure 216 to an etching treatment sufficient to form a third bimetallic structure having, for example, faces (or sides) that are at least partially disordered, defective, and/or porous. For example, the second bimetallic structure 216 can have a regular rhombic dodecahedral morphology while the third bimetallic structure has an irregular rhombic dodecahedral morphology. Additionally, or alternatively, the third bimetallic structure is in the form of a nanoframe, for example, bimetallic nanoframe 218. The bimetallic nanoframe 218 can be characterized as a bimetallic polyhedral nanoframe.

The etching process of operation 330 can be performed by immersing, soaking, introducing, or otherwise subjecting the second bimetallic structure 216 to an acid. The acid can be an inorganic acid, an organic acid, or combinations thereof. Examples of acids include, but are not limited to, acetic acid ($CH_3COOH$), carbonic acid ($H_2CO_3$), propionic acid ($CH_3CH_2COOH$), perchloric acid ($HClO_4$), phosphoric acid ($H_3PO_4$), sulfuric acid ($H_2SO_4$), nitric acid ($HNO_3$), hydrochloric acid (HCl), or combinations thereof. The acid may be provided as a solution, for example, an aqueous solution. In some aspects, the concentration of acid in the aqueous solution is from about 0.01 M to about 10 M, such as from about 0.1 M to about 2 M, such as from about 0.5 M to about 1.5 M, such as from about 1 M to about 1.25 M. In some examples, a molar ratio of second bimetallic structure 216 to acid is 1:500, 1:400, 1:300, 1:200, 1:100, 1:90, 1:80, 1:70, 1:60, 1:50, 1:40, 1:30, 1:20, 1:10, 1:5, 1:3, 1:2, or 1:1, though other molar ratios are contemplated. Each of the foregoing numbers can be preceded by the word "about," "at least about," "less than about," or "more than about," and any of the foregoing numbers can be used singly to describe an open-ended range or in combination to describe a close-ended range. For example, the molar ratio of second bimetallic structure 216 to acid is about 1:1, about 1:200 or more (higher amount of second bimetallic structure 216), or less than about 1:10 (less amount of second bimetallic structure 216). In some examples, the molar ratio of second bimetallic structure 216 to acid is from about 1:500 to about 1:1, such as from about 1:200 to about 1:1, such as from about 1:50 to about 1:1, such as from about 1:20 to about 1:1 based on the starting material molar ratio used for the reaction. In some aspects, the molar ratio of second bimetallic structure 216 to acid is from about 1:10 to about 1:1, such as from about 1:5 to about 1:1, such as from about 1:2 to about 1:1 based on the starting material molar ratio used for the reaction.

When desired, a suitable solvent such as water, a hydrocarbon solvent (for example, octadecene) and/or an ether solvent (for example, phenyl ether) can be utilized.

Conditions 217 effective to form the third bimetallic structure (for example, the bimetallic nanoframe 218) can include a reaction temperature and a reaction time. The reaction temperature (° C.) to form the bimetallic nanoframe 218 can be −10, −5, 0, 5, 10, 15, 20, 25, 30, 35, 40, 45, 50, 55, 60, 65, 70, 75, 80, 85, 90, 95, or 100, though higher or lower temperatures can be used when appropriate. Each of the foregoing numbers can be preceded by the word "about," "at least about," "less than about," or "more than about," and any of the foregoing numbers can be used singly to describe an open-ended range or in combination to describe a close-ended range. For example, the reaction temperature of conditions 217 is about 20° C., about 0° C. or more, or about 50° C. or less. In at least one aspect, the reaction temperature of conditions 217 is greater than about −10° C., such as greater than about 0° C., such as greater than about 15° C., such as from about 20° C. to about 100° C., such as from about 30° C. to about 80° C., such as from about 40° C. to about 60° C., such as from about 45° C. to about 55° C. The reaction time to form the bimetallic nanoframe 218 can be about 30 seconds or more and/or about 168 h or less, such as from about 1 min to about 80 h, such as from about 5 min to about 48 h, such as from about 30 min to about 24 h, though other durations are contemplated. The reaction time to form the bimetallic nanoframe 218 can be more or less depending on, for example, the level of conversion desired. Any reasonable pressure can be used during formation of the bimetallic nanoframe 218.

Conditions 217 effective to form the bimetallic nanoframe 218 can include stirring, mixing, and/or agitation via, for example, sonication. Conditions 217 can optionally include utilizing a non-reactive gas, such as $N_2$ and/or Ar. For example, a second bimetallic structure 216 and etching agent can be placed under these or other non-reactive gases to, for example, degas various components or otherwise remove oxygen from the reaction mixture.

In some aspects, the reaction product comprising the third bimetallic structure (for example, bimetallic nanoframe 218) can be subjected to filtration, separation, cleaning, quenching, washing, purification, and/or other suitable processes to remove undesired components and isolate the third bimetallic structure from the other components of the reaction mixture. For example, the reaction product comprising the third bimetallic structure (which may be in the form of particles) can be centrifuged to separate the third bimetallic structure from the mixture. Additionally, or alternatively, the third bimetallic structure can be washed with polar solvent(s), such as water, acetone, ethanol, methanol, or combinations thereof, and/or non-polar solvent(s), such as hexane, pentane, toluene, or combinations thereof. Other solvents for washing can include ether solvents such as diethyl ether and tetrahydrofuran; chlorocarbon solvents such as dichloromethane and chloroform; as well as ethyl acetate, dimethylformamide, acetonitrile, benzene, isopropanol, n-butanol, n-propanol. Mixtures of two or more of these solvents, in suitable proportions, can be utilized for washing, purifying, or otherwise separating the third bimetallic structure from other components in the reaction mixture. As an example, a solvent or a mixture of solvents can be added to the third bimetallic structure and the resultant mixture centrifuged. The supernatant can be discarded and the remaining pellet can be dispersed in a suitable solvent or mixture of solvents. The resultant pellet and solvent(s) can then be centrifuged to obtain the third bimetallic structure. In these and other aspects, the pellet comprising the third bimetallic structure can be re-solubilized or re-suspended in a suitable solvent such as water or those described above.

The first bimetallic structure 211, second bimetallic structure 216, and/or third bimetallic structure (for example, a bimetallic nanoframe 218) made according to process 300 can have the formula $(M^1)_a(M^2)_b$ (formula (IA)) or the formula $(M^1)_a(M^2)_b(E)_c$ (formula (IB)) as described above, where each of a and b can, independently, vary between one or more operations of process 300. Chemical and physical properties of such structures are described above.

Figure 3B:
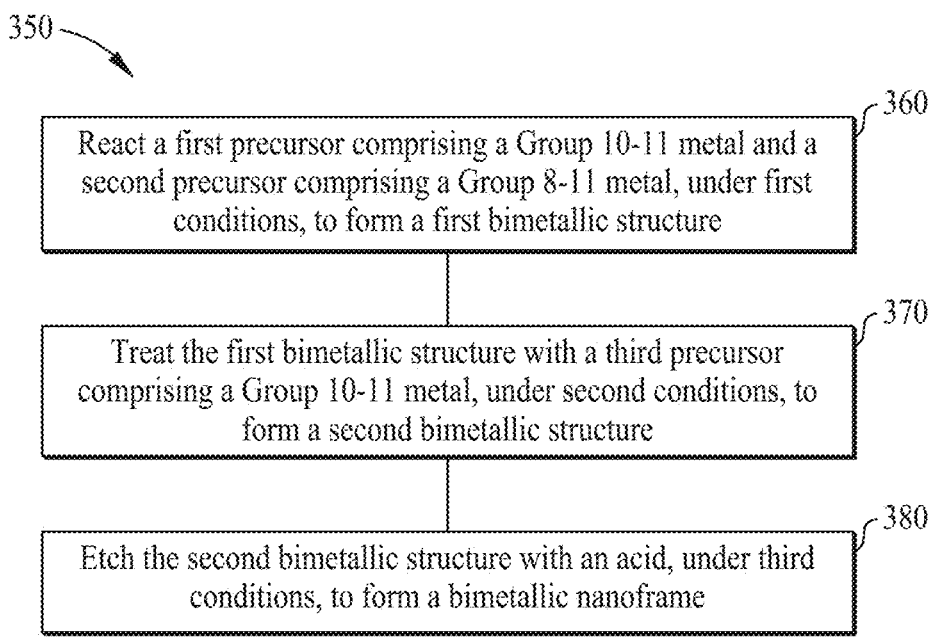
FIG. 3B is a flowchart showing selected operations of an example process for forming a bimetallic structure according to at least one aspect of the present disclosure.

FIG. 3B is a flowchart showing selected operations of a process 350 for forming a bimetallic nanoframe according to at least one aspect of the present disclosure. The process 350 includes reacting a first precursor comprising a Group 10-11 metal and a second precursor comprising a Group 8-11 metal, under first conditions, to form a first bimetallic structure 211 at operation 360. The first precursor can be, or include, the Group 10-11 metal complex 205, and the second precursor can be, or include, the Group 8-11 metal complex 209. These materials as well as the first conditions of operation 360 are described above in relation to process 300 of FIG. 3A. The process 350 further includes treating the first bimetallic structure 211 with a third precursor comprising a Group 10-11 metal, under second conditions, to form a second bimetallic structure 216 at operation 370. Operation 370 can be a metal ion treatment. The third precursor can be or include the Group 10-11 metal complex 212. These materials as well as the second conditions of operation 370 are described above in relation to process 300 of FIG. 3A. The process 350 further includes etching the second bimetallic structure 216 with an acid, under third conditions, to form a third bimetallic structure (for example, a bimetallic nanoframe 218) at operation 380. Acids and third conditions of the etching process of operation 380 are described above in relation to process 300 of FIG. 3A. Chemical and physical properties of the bimetallic nanoframe 218 are described above. The first bimetallic structure 211, second bimetallic structure 216, and/or third bimetallic structure (for example, a bimetallic nanoframe 218) made according to process 350 can have the formula $(M^1)_a(M^2)_b$ (formula (IA)) or the formula $(M^1)_a(M^2)_b(E)_c$ (formula (IB)) as described above, where each of a and b can, independently, vary between one or more operations of process 300. Chemical and physical properties of such structures are described above.

Relative to conventional technologies, aspects of the processes for forming the bimetallic structures useful for catalyst compositions described herein are efficient and utilize low-cost materials.

Aspects of the present disclosure also relate to uses of the bimetallic structures described herein. As described herein, the bimetallic structures can be at least a portion of the catalyst composition. The bimetallic structures and catalyst compositions comprising the bimetallic can be used in, for example, fuel cells such as PEMFCs, fuel cell vehicles, including automobiles, buses, motorcycles, forklifts, watercraft such as submarines and boats, as well as portable and stationary applications, among other applications. Relative to conventional catalysts, the bimetallic nanoframes (as well as bimetallic polyhedral nanoframes) can have a higher concentration of catalytic sites and a higher surface area to perform reactions. The higher concentration of catalytic sites and higher surface area of the bimetallic nanoframes can be due to the nanoframes being at least partially hollow and/or having pores.

In some aspects, the bimetallic structures and/or catalyst compositions comprising such bimetallic structures can be used for various conversion reactions such as oxygen reduction reaction (ORR), oxygen evolution reaction (OER), hydrogen evolution reaction (HER) such as the conversion of water into hydrogen, and the oxidation of alcohols.

In some examples, a method of using the catalyst composition can include introducing a reactant with a bimetallic structure described herein (or a catalyst composition comprising a bimetallic structure) to form a conversion product. For example, a process for converting water to conversion product(s) can include introducing water with a bimetallic structure described herein (and/or composition comprising a bimetallic structure), and obtaining conversion products, for example, hydrogen.

As another example, a process for reducing oxygen ($O_2$) to conversion product(s) such as water and/or hydrogen peroxide include introducing $O_2$ to a bimetallic structure described herein (or composition comprising a bimetallic structure). The process can further include applying or introducing a voltage before, during, and/or after introducing oxygen to the electrolytes. Applied voltages can be from about 0.1 V versus RHE to about 1.1 V versus RHE, such as from about 0.2 V versus RHE to about 1.1 V versus RHE, such as from about 0.3V versus RHE to about 1.1 V versus RHE, though higher or lower applied voltages are contemplated.

Accordingly, and in some aspects, bimetallic structures described herein can be used in such applications and/or can be incorporated into desired devices (for example, reactors, fuel cells) useful for such applications.

The following examples are put forth so as to provide those of ordinary skill in the art with a complete disclosure and description of how to make and use aspects of the present disclosure, and are not intended to limit the scope of aspects of the present disclosure. Efforts have been made to ensure accuracy with respect to numbers used (such as the amounts, dimensions) but some experimental errors and deviations should be accounted for.

EXAMPLES

Various example, but non-limiting, catalysts according to some aspects described herein were prepared. The example catalysts were compared to a commercial platinum on carbon (Pt/C) catalyst. The comparative Pt/C catalyst represents the state-of-the-art for fuel cells and is 20 wt % Pt loading on an activated carbon support (Vulcan XC-72R).
Materials and Characterization Methods Oleylamine (OLA, 70%), hexadecylamine (90%, HDA), octadecylamine (95%, ODA), nickel acetylacetonate (Ni $(acac)_2$), nickel nitrate ($Ni(NO_3)_2$), nickel chloride ($NiCl_2$), hexachloroplatinic acid hexahydrate ($H_2PtCl_6 \cdot 6H_2O$), sodium hexachloroplatinate hexahydrate ($Na_2PtCl_6 \cdot 6H_2O$), platinum chloride ($PtCl_4$), platinum acetylacetonate (Pt $(C_5H_7O_2)_2$), toluene (99.9%), acetone (99%), and chloroform (99.9%), 1-octadecene (ODE, 98%) were purchased from Sigma-Aldrich. Acetic acid ($CH_3COOH$) were purchased from Alfa Aesar. Tetradecylamine (TDA, >96%) was purchased from TCI. Hexane (99%), methanol (99%), and ethanol (200 proof) were purchase from Fisher Chemicals. All chemicals were used as received.

The surface morphologies were investigated by a scanning electron microscope (SEM, QUANTA FEG 650) from FEI with a field emitter as electron source. A Bruker D8 Advance X-ray diffractometer with Cu Kα radiation operated at a tube voltage of 40 kV and a current of 40 mA was used to obtain X-ray diffraction (XRD) patterns. Transmission electron microscopy (TEM) images were captured using an FEI Tecnai 20 microscope with an accelerating voltage of 200 kV.

Inductively coupled plasma-mass spectrometry (ICP-MS) was used to measure metal contents in the samples. ICP-MS was performed using an inductively coupled mass spectrometer (Thermo Fisher Scientific iCAP™ RQ ICP-MS).
Electrochemical Measurements All electrochemical measurements were measured on an electrochemical workstation (BioLogic) at room temperature (25° C.), using a three electrode electrochemical setup with a rotating disk electrode (RDE) system. A glassy carbon working electrode (GCE, 5 mm inner diameter, 0.196 cm$^2$), a graphite rod counter electrode and a 3.0 M KCl saturated Ag/AgCl reference electrode were used for all the tests. All potentials are provided with respect to a reversible hydrogen electrode (RHE). The cyclic voltammetry (CV) scans were performed at a rate of 50 mV si near the thermodynamic potential of the $H^+/H_2$ reaction. The potential at the zero current point was chosen as the reaction potential of the hydrogen electrode. The potential at the zero current point was determined to be −0.287 V, so the potential measured with a Ag/AgCl electrode can be related by E (RHE)=E (Ag/AgCl)+0.287 V.

Before the electrochemical tests, catalyst samples were first loaded on the commercial carbon support to provide a dispersion. The catalyst samples were prepared by loading the synthesized catalysts on the commercial carbon support (Vulcan XC-72R). For comparison, a commercial platinum on carbon (Pt/C, 20 wt %, Sigma-Aldrich) was used as the baseline. The electrode was prepared as follows. First, a catalyst ink was prepared by ultrasonicating a mixture of about 2.0 mg catalyst sample, about 1.6 mL water, about 0.4 mL isopropanol, and about 20 μL Nafion™ solution (5 wt %, Sigma-Aldrich) for 30 min. About 10 μL of the catalyst ink was spread onto the GCE surface using a micropipette and dried under ambient conditions. Loading for all the catalyst samples was kept at 17 μg cm$^{-2}$. ICP-MS measurements were performed on the initial mass of the catalyst and on the mass after a selected number of.

Cyclic voltammetry characterization of the catalyst samples in the absence of oxygen was carried out in the potential range of 0.1-1.1 V (vs. RHE) at a scan rate of 50 mV s$^{-1}$ in a N$_2$-saturated 0.1 M HClO$_4$ solution. The oxygen reduction reaction (ORR) polarization curves were recorded in an O$_2$-saturated 0.1 M HClO$_4$ electrolyte solution at a rotation speed of 1600 rpm and a scan rate of 10 mV s$^{-1}$.

For the CV activation and ORR process of the example Pt—Ni nanocatalysts, the ORR activity was conducted immediately after a ten-cycle CV activation. Durability tests were performed in an O$_2$-saturated 0.1 M HClO$_4$ solution in the voltage range of 0.6-1.0 V at room temperature. After the durability test, the catalyst samples were collected by sonicating the GCE in ethanol for further structural and compositional analysis.

Mass activity and loss in mass activity is determined at 0.9 V with a reference to the reversible hydrogen electrode ($V_{RHE}$).

Example 1: Synthesis of Example Metal Amines

Ex. 1A. Synthesis of Nickel-OLA (Ni-OLA) Precursor Stock Solution: Ni(acac)$_2$ (~128 mg, ~0.5 mmol) and OLA (~4 mL) were mixed in a flask under an Ar or N$_2$ environment to form a solution/suspension. The solution/suspension was then heated at about 50-150° C. and shaken for about 5 minutes. The solution/suspension was then cooled to about room temperature. This Ni-OLA solution/suspension was utilized as a Ni-OLA precursor stock solution. Similar precursor stock solutions can be prepared using, for example, nickel nitrate, nickel chloride, among other nickel salts. Various other amines can also be utilized such as TDA, HDA, ODA, among other amines. Larger or smaller amounts of each are also contemplated.

Ex. 1B. Synthesis of Platinum-OLA (Pt-OLA) Precursor Stock Solution: H$_2$PtCl$_6$·6H$_2$O (~0.1 mmol, 51.7 mg) and OLA (~3 mL) were mixed in a flask under an Ar or N$_2$ environment to form a solution/suspension. The solution/suspension was then heated at about 50-150° C. and shaken for about 5 minutes. The solution/suspension was then cooled to about room temperature. This Pt-OLA solution/suspension was utilized as a Pt-OLA precursor stock solution.

Similar precursor stock solutions can be prepared using other platinum materials as well as other amines such as, for example, TDA, HDA, ODA, among other amines. Larger or smaller amounts of each are also contemplated.

Example 2: Synthesis of Example Polyhedral Nanoparticles

Ex. 2. Synthesis of Platinum-Nickel (Pt—Ni) polyhedral nanoparticles (NPs): H$_2$PtCl$_6$·6H$_2$O (~0.1 mmol, 51.7 mg) and HDA (~40 mmol, 10.0 g) were loaded into a 50 mL three-neck flask equipped with a magnetic stir bar to form a reaction mixture. Argon gas was flown into the flask for about 20 min to remove O$_2$ from the system. The reaction mixture was heated to about 200° C. with stirring, the reaction mixture quickly turned gray, and Ni-OLA precursor stock solution (~3 mL) was injected into the reaction mixture. After about 20 min at 200° C. with stirring, the reaction mixture was cooled to about 80° C. At this point, about 5 mL of hexane (or another hydrophobic solvent such as toluene and/or chloroform) and 5 mL of ethanol were added and the mixture was centrifuged at about 3,000 rpm for about 2 min to remove excess reactants and excess amine. The supernatant was discarded. About 10 mL of hexane was then added to the sediment, and the mixture was centrifuged at about 4,000 rpm for about 5 min. The washing procedure was repeated twice to remove unreacted precursors and excess amine. The Pt—Ni polyhedral NPs were stored in a hydrophobic solvent (for example, hexane, toluene, and/or chloroform) before characterization.

Various temperatures at which the injection of the Ni-OLA precursor were tested and can vary from, for example, about 80° C. to about 210° C., though other temperatures are contemplated. Other platinum materials can be utilized as well as other amines such as, for example, TDA, ODA, OLA, among other amines. Larger or smaller amounts of each are also contemplated.

Example 3: Example Platinum Ion Treatment

Ex. 3. Pt ion treatment of Pt—Ni polyhedral NPs: Pt—Ni polyhedral NPs (~20 mg), 1-octadecene (ODE, ~6 mL), and OLA (~2 mL) were loaded into a 50 mL flask equipped with a magnetic stir bar to form a reaction mixture. Argon gas was flown into the flask for about 20 min to remove O$_2$ from the system. The reaction mixture was heated to about 80° C. with stirring, at which point Pt-OLA precursor stock solution (~3 mL) was injected into the flask under argon gas flow. The reaction mixture was then heated to about 200° C. and kept at this temperature for about 60 min with stirring. The reaction mixture was then cooled to about room temperature. At this point, about 5 mL of hexane (or another hydrophobic solvent such as toluene and/or chloroform) and 5 mL of ethanol were added and the mixture was centrifuged at about 3,000 rpm for about 2 min to remove excess reactants and excess amine. The supernatant was discarded. About 10 mL of hexane was then added to the sediment, and the mixture was centrifuged at about 4,000 rpm for about 5 min. The washing procedure was repeated twice to remove unreacted precursors and excess amine. The Pt ion treated Pt—Ni polyhedral NPs were stored in a hydrophobic solvent (for example, hexane, toluene, and/or chloroform) before characterization.

Various temperatures at which the injection of the Pt-OLA precursor and resultant reaction mixture after injection were tested and can vary from, for example, about 80° C. to about 300° C., though other temperatures are contemplated. The reaction time after injection of Pt-OLA precursor can also vary from about 5 min to about 5 hours, though other durations are contemplated. Other amines such as, for example, HDA, ODA, TDA, among other amines can be utilized. Solvents other than ODE can be utilized additionally, or alternatively, such as diphenyl ether and biphenyl, among other solvents. Larger or smaller amounts of the materials are also contemplated.

Example 4: Example Acid Treatment to Form Nanoframes

Ex. 4. Acid treatment of Pt ion treated Pt—Ni polyhedral NPs: Pt ion treated Pt—Ni polyhedral NPs (~20 mg), acetic acid (~2 mL), and water (~2-10 mL) were loaded into a 25 mL flask equipped with a magnetic stir bar to form a reaction mixture. Argon gas was flown into the flask for about 20 min to remove $O_2$ from the system. The reaction mixture was stirred at about room temperature for about 48 hours. The reaction mixture was then centrifuged at about 3,000 rpm for about 2 min to remove unreacted materials and excess acid. The supernatant was discarded. About 5 mL of DI water was then added to the sediment, and the mixture was centrifuged at about 4,000 rpm for about 5 min. The washing procedure was repeated twice to remove unreacted precursors and excess acid. The resultant Pt—Ni hollow polyhedral NPs (or nanoframes) were stored in a hydrophilic solvent (for example, methanol, ethanol, and/or acetone) before characterization.

Other acids can be used in addition to, or as an alternative to, acetic acid, such as phosphoric acid, carbonic acid, sulfuric acid, and/or perchloric acid. Other solvents can be used in addition to, or as an alternative to, DI water, such as methanol, ethanol, and/or acetone. Reaction temperatures may also vary from about 20° C. to about 60° C., though other temperatures are contemplated. Reaction time may also vary from about 1 min to about 168 hours, though other durations are contemplated.

Figure 4A:
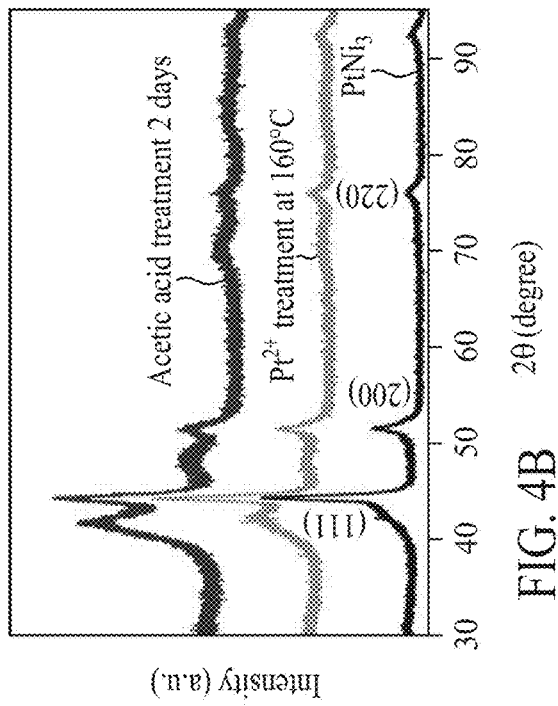
FIG. 4A is an exemplary X-ray diffraction (XRD) pattern of example $PtNi_3$ nanoparticles, example Pt—Ni nanocrystals formed after $Pt^{2+}$ ion treatment at 120° C., and example Pt—Ni nanocrystals formed after acid treatment according to at least one aspect of the present disclosure.
Figure 4B:
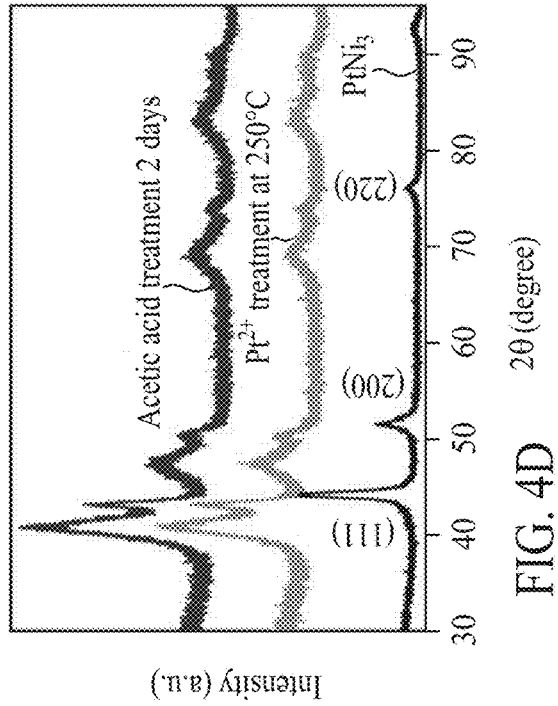
FIG. 4B is an exemplary XRD pattern of example $PtNi_3$ nanoparticles, example Pt—Ni nanocrystals formed after $Pt^{2+}$ ion treatment at 160° C., and example Pt—Ni nanocrystals formed after acid treatment according to at least one aspect of the present disclosure.
Figure 4C:
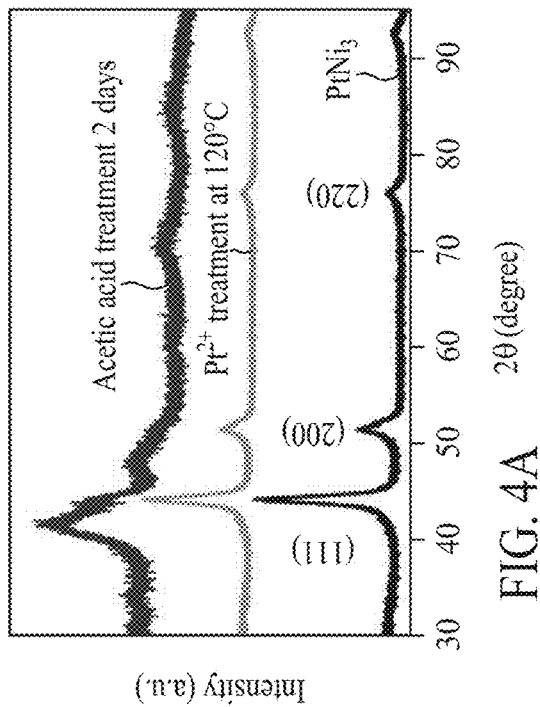
FIG. 4C is an exemplary XRD pattern of example $PtNi_3$ nanoparticles, example Pt—Ni nanocrystals formed after $Pt^{2+}$ ion treatment at 200° C., and example Pt—Ni nanocrystals formed after acid treatment according to at least one aspect of the present disclosure
Figure 4D:
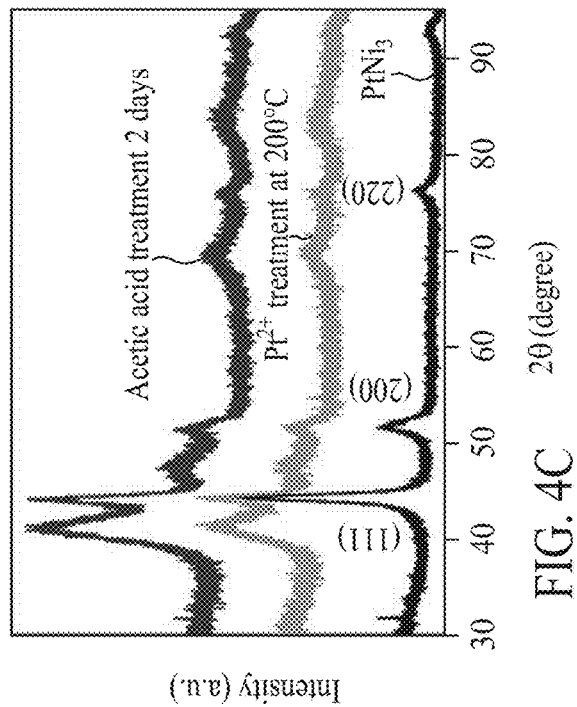
FIG. 4D is an exemplary XRD pattern of example $PtNi_3$ nanoparticles, example Pt—Ni nanocrystals formed after $Pt^{2+}$ ion treatment at 250° C., and example Pt—Ni nanocrystals formed after acid treatment according to at least one aspect of the present disclosure.

FIGS. 4A, 4B, 4C, and 4D show exemplary XRD patterns of example Pt—Ni polyhedral nanocrystals after a $Pt^{2+}$ ion treatment at different temperatures and an acetic acid treatment. The example Pt—Ni polyhedral nanocrystals are at least partially hollow polyhedral nanoframes. The starting materials, labeled as $PtNi_3$, prior to the $Pt^{2+}$ ion treatment and acetic acid treatment are also shown in FIGS. 4A-4D. For the starting materials, $PtNi_3$ polyhedral nanoparticles had diffraction peaks of {111}, {200}, {220}, which is consistent with a face centered cubic structure. Four batches of the $PtNi_3$ polyhedral nanoparticles were employed and etched by platinum ion for about 1 hour at different temperatures—about 120° C. (FIG. 4A), about 160° C. (FIG. 4B), about 200° C. (FIG. 4C), and about 250° C. (FIG. 4D). As shown in FIG. 4A, the platinum ion etching at about 120° C. did not result in a clear shift of the diffraction peaks under the conditions tested. With increasing reaction temperature of $Pt^{2+}$ ion treatment (shown in FIGS. 4B-4D), the diffraction peaks located at {111} split into two sets of diffraction patterns and assigned to a phase ($Pt^{52}Ni_{48}$) and a Ni-rich phase ($Pt_{30}Ni_{70}$) based on Vegard's law. After two days of acid treatment, the diffraction peak of {111} of the 120° C. $Pt^{2+}$ ion treated products had a clear change indicating that surface Ni atoms can be removed through acid treatment without changing other products. Overall, the XRD results indicated that the surface nickel atoms of Pt—Ni polyhedral NPs can be stabilized according to aspects described herein.

Figure 5C:
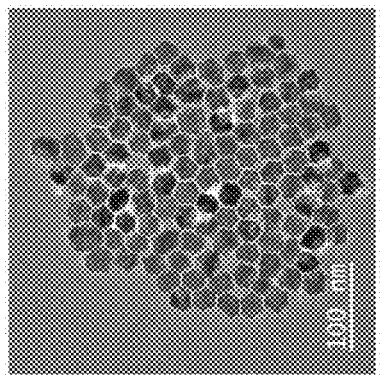
FIG. 5C is an exemplary TEM image of example Pt—Ni nanocrystals formed from $Pt^{2+}$ ion treatment of $PtNi_3$ nanoparticles at 160° C. according to at least one aspect of the present disclosure.
Figure 5E:
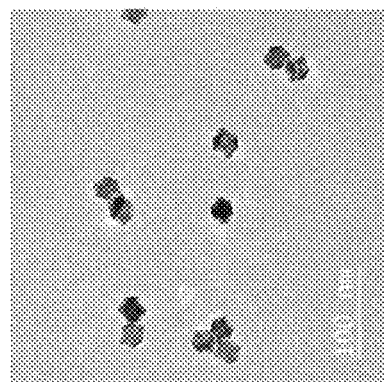
FIG. 5E is an exemplary TEM image of example Pt—Ni nanocrystals formed from $Pt^{2+}$ ion treatment of $PtNi_3$ nanoparticles at 250° C. according to at least one aspect of the present disclosure.
Figure 5B:
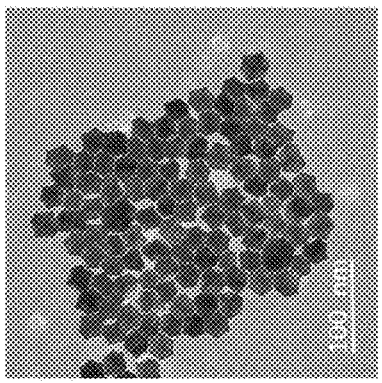
FIG. 5B is an exemplary TEM image of example Pt—Ni nanocrystals formed from $Pt^{2+}$ ion treatment of $PtNi_3$ nanoparticles at 120° C. according to at least one aspect of the present disclosure.
Figure 5D:
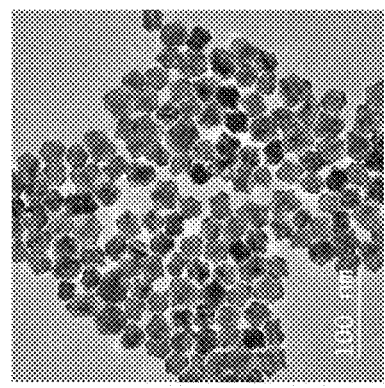
FIG. 5D is an exemplary TEM image of example Pt—Ni nanocrystals formed from $Pt^{2+}$ ion treatment of $PtNi_3$ nanoparticles at 200° C. according to at least one aspect of the present disclosure.
Figure 5A:
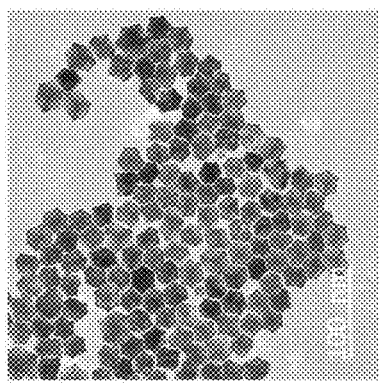
FIG. 5A is an exemplary transmission electron microscopy (TEM) image of example $PtNi_3$ nanoparticles according to at least one aspect of the present disclosure.

FIG. 5A shows an exemplary TEM image of example $PtNi_3$ polyhedral nanoparticles prior to $Pt^{2+}$ ion treatment. FIGS. 5B, 5C, 5D, and 5E show exemplary TEM images of example Pt—Ni polyhedral nanocrystals after $Pt^{2+}$ ion treatment at about 120° C., about 160° C., about 200° C., and about 250° C., respectively. The TEM images indicate that increasing temperature during $Pt^{2+}$ ion treatment can alter the catalysts' surface without altering the size and morphology of the Pt—Ni nanostructures. The alteration of the catalyst surface is due to the lower amount of Ni observed after ion treatment.

Figure 6A:
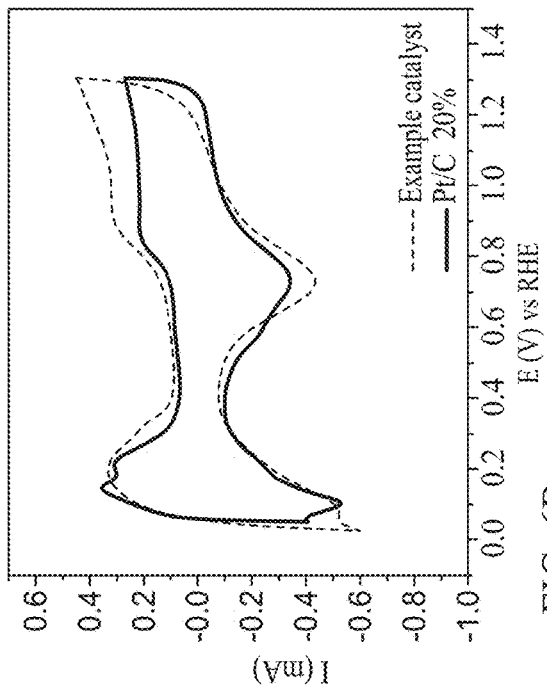
FIG. 6A is an exemplary cyclic voltammetry (CV) curve for example Pt—Ni nanocrystals formed by a $Pt^{2+}$ ion treatment of $PtNi_3$ nanoparticles at 120° C. and an acid treatment, and a comparative example, Pt/C, according to at least one aspect of the present disclosure.
Figure 6B:
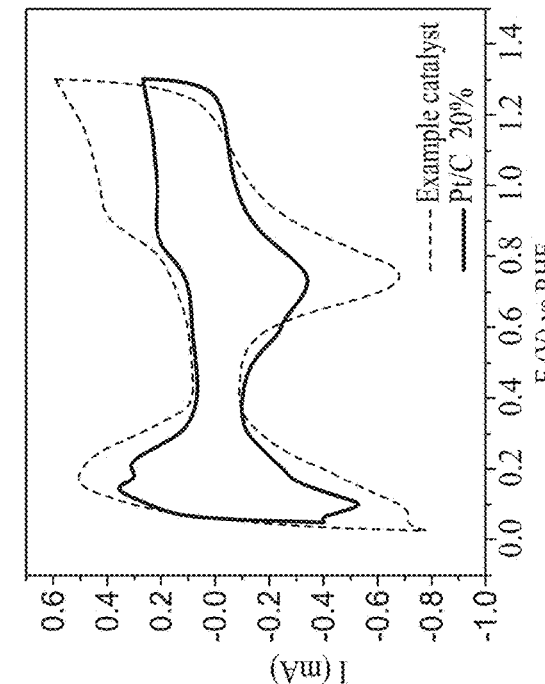
FIG. 6B is an exemplary CV curve for example Pt—Ni nanocrystals formed by a $Pt^{2+}$ ion treatment of $PtNi_3$ nanoparticles at 160° C. and an acid treatment, and a comparative example, Pt/C, according to at least one aspect of the present disclosure.
Figure 6C:
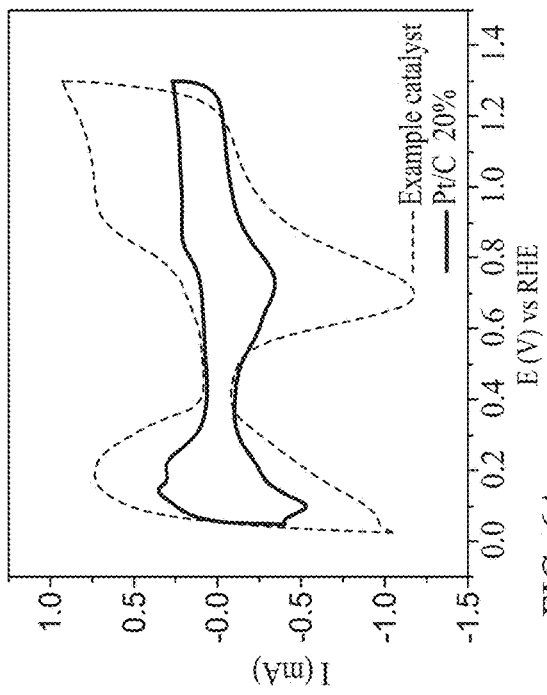
FIG. 6C is an exemplary CV curve for example Pt—Ni nanocrystals formed by a $Pt^{2+}$ ion treatment of $PtNi_3$ nanoparticles at 200° C. and an acid treatment, and a comparative example, Pt/C, according to at least one aspect of the present disclosure.
Figure 6D:
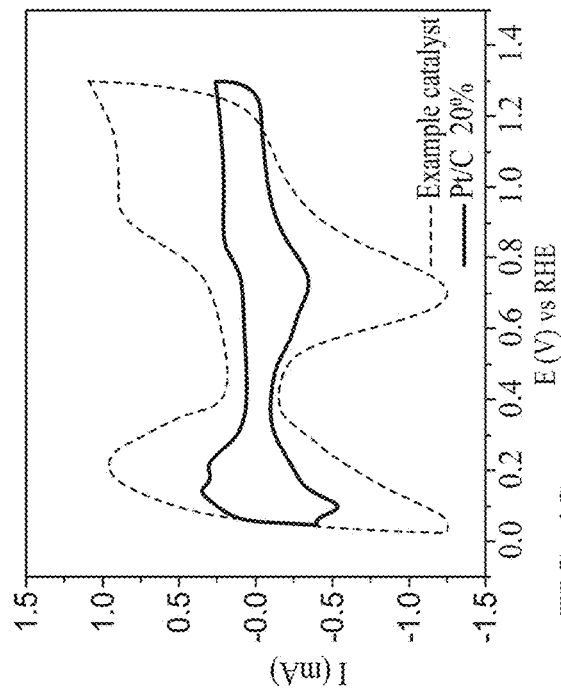
FIG. 6D is an exemplary CV curve for example Pt—Ni nanocrystals formed by a $Pt^{2+}$ ion treatment of $PtNi_3$ nanoparticles at 250° C. and an acid treatment, and a comparative example, Pt/C, according to at least one aspect of the present disclosure.

FIGS. 6A-6D show exemplary cyclic voltammetry (CV) curves of example Pt—Ni polyhedral nanocrystals. The example Pt—Ni polyhedral nanocrystals are at least partially hollow polyhedral nanoframes. The Pt—Ni polyhedral nanocrystals were synthesized by subjecting $PtNi_3$ polyhedral nanoparticles to $Pt^{2+}$ ion treatment (at different temperatures) and a subsequent acetic acid treatment. The temperatures for the $Pt^{2+}$ ion treatment were about 120° C. (FIG. 6A), about 160° C. (FIG. 6B), about 200° C. (FIG. 6C), and about 250° C. (FIG. 6D). The CV curves of the comparative example, Pt/C (20 wt % Pt on carbon support), are also shown in FIGS. 6A-6D. The results indicated that with the same Pt mass loading, the electrochemical surface active area (ECSA) of the example Pt—Ni polyhedral nanocatalysts is significantly higher than that of the comparative Pt/C due to, for example, the hollow nature of the formed Pt—Ni nanocatalysts, and thereby having significantly more active surface area and an open nanostructure. The ECSA activity for the non-limiting examples shown in FIGS. 6A, 6B, 6C, and 6D were about 107 $m^2$/g(Pt), about 97 $m^2$/g(Pt), about 110 $m^2$/g(Pt), and about 101 $m^2$/g(Pt), respectively.

Figure 7:
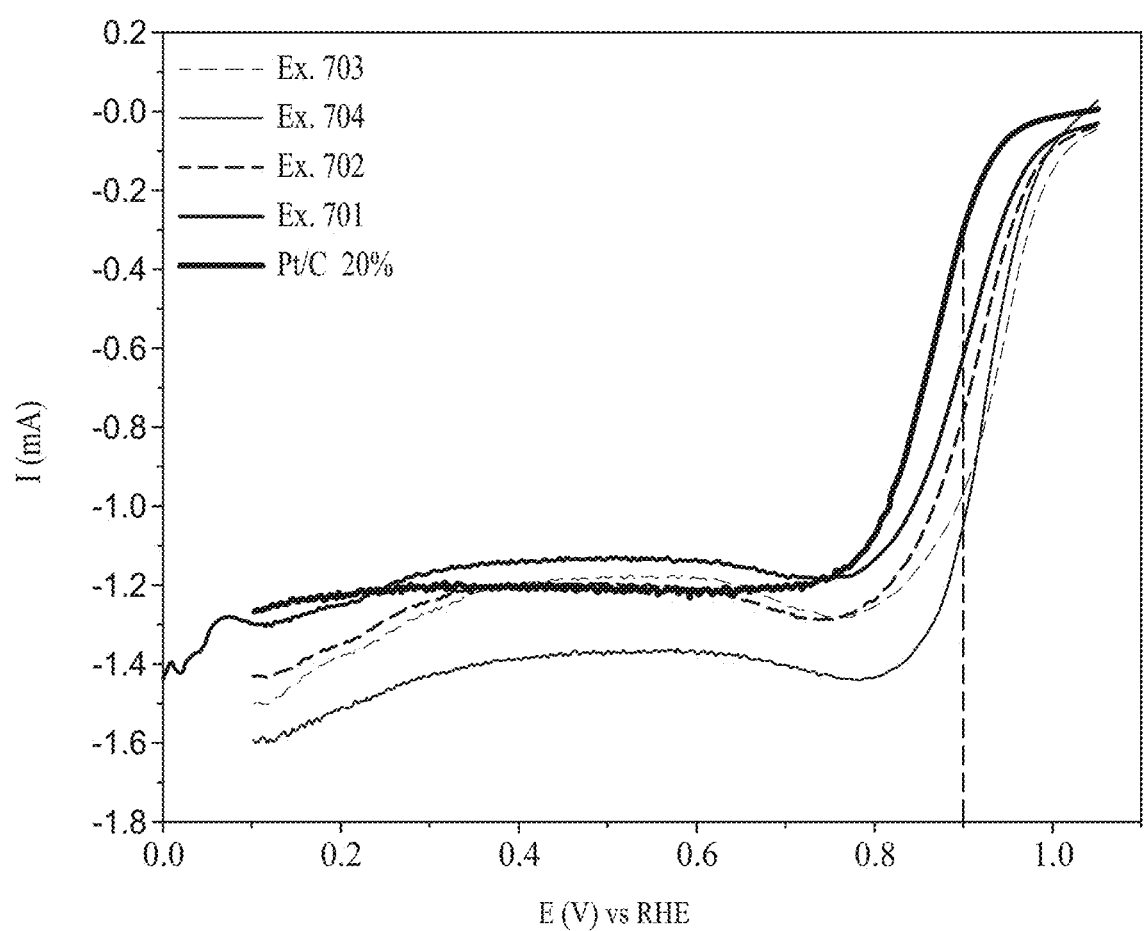
FIG. 7 is an exemplary linear sweeping voltammetry curve of various example Pt—Ni nanocrystals and a comparative example according to at least one aspect of the present disclosure.

The electrocatalytic properties of Pt—Ni hollow nanocatalysts (for example, nanoframes) were evaluated and compared to a commercial Pt/C nanoscale electrocatalysts (comparative example) as shown in FIG. 7. The Pt/C catalyst represents the current state-of-the-art, and the vertical dashed line indicates to read the current at 0.9 V for linear sweeping voltammetry curves. Specifically, FIG. 7 shows exemplary linear sweeping voltammetry curves for example Pt—Ni hollow nanocatalysts on carbon (Pt—Ni/C) and the comparative Pt/C electrocatalyst at 10 mV $s^{-1}$. Examples 701, 702, 703, and 704 represent the example catalysts formed by subjecting $PtNi_3$ nanoparticles to a $Pt^{2+}$ ion treatment at 120° C., 160° C., 200° C., 250° C., respectively, followed by a 2-day acid treatment. Each of the Pt—Ni hollow nanocatalysts were then loaded onto a commercial carbon support as described above.

The polarization curves show a substantial increase in ORR activity when using the Pt—Ni/C hollow nanocatalysts instead of the commercial state-of-the-art Pt/C electrocatalyst. The mass activity of Pt—Ni/C was determined to be about 2.64 A/mg(Pt). The Pt—Ni/C hollow nanocatalysts showed about a 19-fold increase in mass-specific activity than that of the comparative Pt/C (0.13 A/mg(Pt)). Additionally, the Pt—Ni/C hollow nanocatalysts are about 6 times higher or more than the Department of Energy target for electrocatalysts (DOE target: mass activity >0.44 A/mg (Pt) in PEMFCs).

Figure 8A:
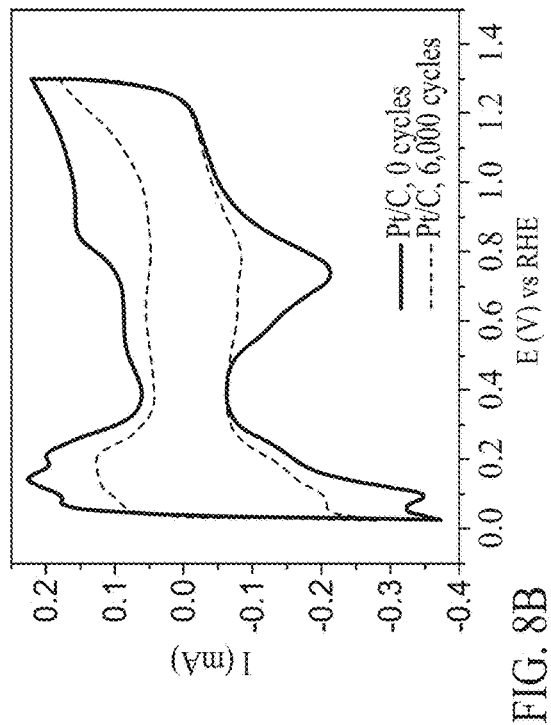
FIG. 8A is an exemplary TEM image of example Pt—Ni nanocrystals loaded on carbon according to at least one aspect of the present disclosure.

FIG. 8A is an exemplary TEM image of example Pt—Ni hollow nanocatalysts (for example, nanoframes) on a carbon support (Pt—Ni/C). The example Pt—Ni/C was used for stability and durability investigations as described below. Prior to loading on the carbon support, the Pt—Ni hollow nanocatalysts were synthesized by subjecting $PtNi_3$ nanoparticles to a $Pt^{2+}$ ion treatment at 200° C. with a subsequent two-day acid treatment.

Figure 8B:
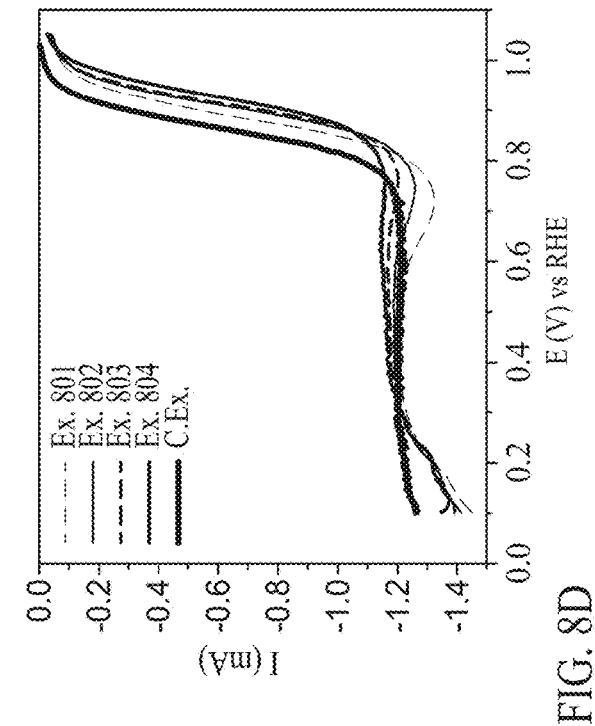
FIG. 8B shows CV curves of a comparative example, Pt/C, after 0 cycles and 6,000 cycles.

To evaluate stability, Pt/C (comparative) and example Pt—Ni/C hollow nanocatalysts (for example, nanoframes) were subjected to continuous cycling between 0.6 and 1.0 V in an $N_2$-saturated 0.1 M $HClO_4$ solution. The ORR performance recorded over 6,000 cycles show that the ECSA of the comparative Pt/C catalyst declined by 48.3% as shown by the CV curves in FIG. 8B.

Figure 8C:
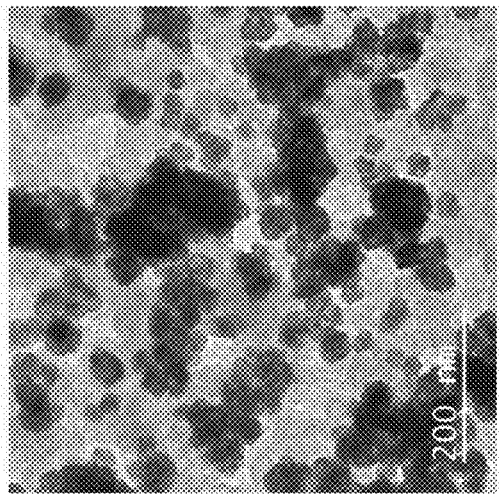
FIG. 8C shows exemplary CV curves of example Pt—Ni/C nanocrystals after 0 cycles, 6,000 cycles, 15,000 cycles, and 30,000 cycles according to at least one aspect of the present disclosure.
Figure 8D:
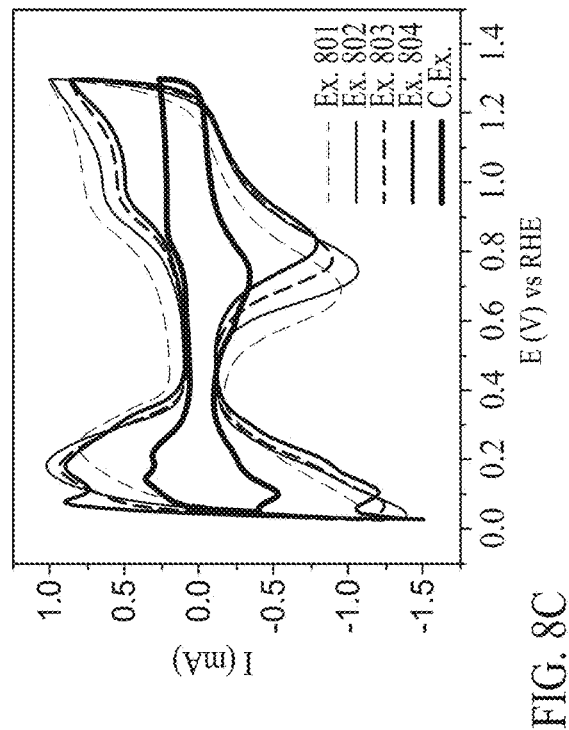
FIG. 8D shows exemplary linear sweeping voltammetry curves of example Pt—Ni/C nanocrystals after 0 cycles, 6,000 cycles, 15,000 cycles, and 30,000 cycles according to at least one aspect of the present disclosure.

The acid treatment was also investigated using acetic acid or sulfuric acid. FIGS. 8C and 8D, shows exemplary CV curves and linear sweeping voltammetry curves, respectively, of example Pt—Ni/C nanocrystals after 0 cycles (Ex. 801), 6,000 cycles (Ex. 802), 15,000 cycles (Ex. 803), and 30,000 cycles (Ex. 804). Pt/C was used as the comparative example (C.Ex.). The example Pt—Ni hollow nanocatalysts (for example, nanoframes) were made by subjecting $PtNi_3$ nanoparticles to Pt ion treatment at about 200° C., followed by a 2-day treatment with acetic acid. The Pt—Ni hollow nanocatalysts were then loaded onto the carbon support.

Figure 9B:
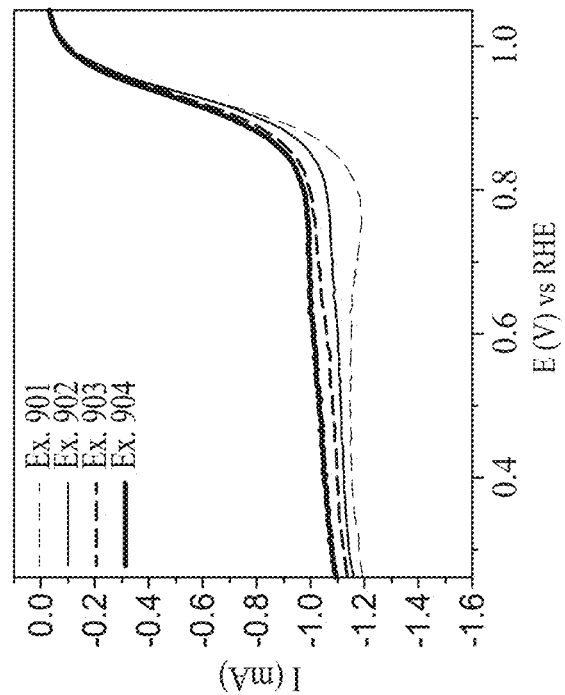
FIG. 9B shows exemplary linear sweeping voltammetry curves of example Pt—Ni/C nanocrystals after 0 cycles, 15,000 cycles, 30,000 cycles, and 50,000 cycles according to at least one aspect of the present disclosure.
Figure 9A:
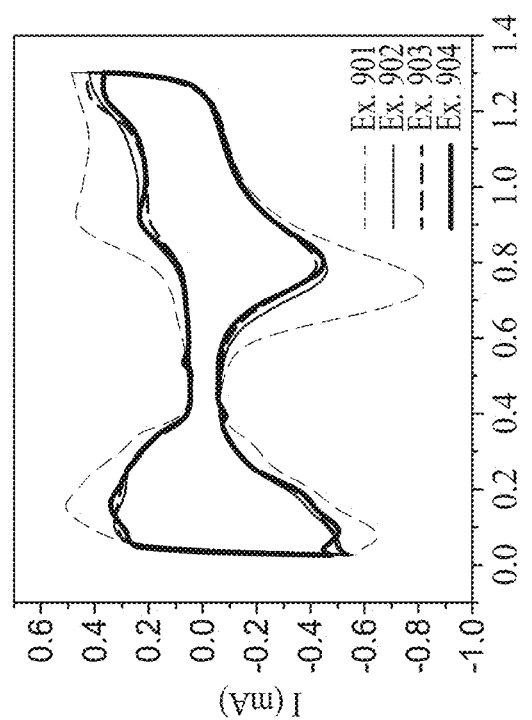
FIG. 9A shows exemplary CV curves of example Pt—Ni/C nanocrystals after 0 cycles, 15,000 cycles, 30,000 cycles, and 50,000 cycles according to at least one aspect of the present disclosure.

FIGS. 9A and 9B show exemplary CV curves and linear sweeping voltammetry curves, respectively, of example Pt—Ni/C nanocrystals after 0 cycles (Ex. 901), 15,000 cycles (Ex. 902), 30,000 cycles (Ex. 903), and 50,000 cycles (Ex. 904). Pt/C was used as the comparative example (C.Ex.). The example Pt—Ni hollow nanocatalysts (for example, nanoframes) were made by subjecting $PtNi_3$ nanoparticles to Pt ion treatment at about 200° C., followed by a 2-day treatment with sulfuric acid. The Pt—Ni hollow nanocatalysts were then loaded onto the carbon support.

As shown in FIGS. 8C and 8D, the ORR performance of the example Pt—Ni/C hollow nanocatalysts were significantly better than the comparative Pt/C catalyst. The cyclic voltammetry curve and linear sweeping voltammetry curve of the comparative Pt/C catalyst shown in FIG. 8C and FIG. 8D is after 10 cycles activation. The ECSA of the example Pt—Ni/C was determined to be about 112 $m^2/g(Pt)$ and the mass activity of Pt—Ni/C was determined to be about 2.64 A/mg(Pt). The comparative Pt/C catalyst had an ECSA and mass activity of 90 $m^2/g(Pt)$ and 0.13 A/mg(Pt), respectively. Of note, the ORR performance variations recorded show that the mass activity and ECSA of Pt—Ni/C hollow nanocatalysts actually increased after 30,000 cycles. The data shown in FIGS. 8C and 8D indicates that the example Pt—Ni/C catalysts show better mass activities after 30,000 cycles than that of fresh Pt/C.

The effect of acids on the durability of the Pt—Ni/C hollow nanocatalysts (for example, nanoframes) were investigated. FIGS. 9A and 9B show CV curves and linear sweeping voltammetry curves, respectively, of example Pt—Ni/C hollow nanocatalysts synthesized by Pt-ion treatment at 200° C. followed by sulfuric acid treatment for 2 days. As shown, the number of cycles tested were 0 cycles, 15,000 cycles, 30,000 cycles, and 50,000 cycles. Even after the prolonged durability test of 50,000 cycles, the mass activity of the Pt—Ni/C hollow nanocatalysts still exceeded the DOE's durability target at 30,000 cycles (DOE target for durability of mass activity: <40% loss in initial activity at 0.9 V after 30,000 cycles in PEMFCs). The ECSA of the example Pt—Ni/C was determined to be about 105 $m^2/g(Pt)$ and the mass activity of Pt—Ni/C was determined to be about 2.23 A/mg(Pt). The comparative Pt/C catalyst had an ECSA and mass activity of 90 $m^2/g(Pt)$ and 0.13 A/mg(Pt), respectively. The data shown in FIGS. 8C and 8D indicates that the example Pt—Ni/C catalysts show better mass activities after 50,000 cycles than that of fresh Pt/C.

Overall, the bimetallic structures described herein, for example, the bimetallic hollow nanocatalysts, can achieve significantly higher mass activities, durabilities, and catalyst properties relative to the state-of-the-art Pt/C catalysts.

ASPECTS LISTING

The present disclosure provides, among others, the following aspects, each of which can be considered as optionally including any alternate aspects:

Clause 1. A process for forming a bimetallic nanoframe, comprising:
    forming a first bimetallic structure by reacting a first precursor and a second precursor, the first precursor comprising platinum (Pt), the second precursor comprising a Group 8-11 metal ($M^2$), wherein $M^2$ is free of Pt;
    reacting a third precursor comprising Pt with the first bimetallic structure at a temperature of about 80° C. to about 300° C. to form a second bimetallic structure, the second bimetallic structure having a higher molar ratio of Pt to Group 8-11 metal than that of the first bimetallic structure; and
    introducing the second bimetallic structure with an acid to form the bimetallic nanoframe, the bimetallic nanoframe having a higher molar ratio of Pt to Group 8-11 metal than that of the second bimetallic structure, the bimetallic nanoframe having the formula:

$$(Pt)_a(M^2)_b,$$

wherein:
    a is the amount of Pt;
    b is the amount of $M^2$; and
    a molar ratio of a:b is from about 99:1 to about 25:75.

Clause 2. The process of Clause 1, wherein the Group 8-11 metal comprises Fe, Ru, Os, Co, Rh, Ir, Ni, Pd, Cu, Ag, Au, or combinations thereof.

Clause 3. The process of Clause 1 or Clause 2, wherein the Group 8-11 metal is selected from the group consisting of Ni, Fe, Co, Pd, Au, Ag, and combinations thereof.

Clause 4. The process of any of Clauses 1-3, wherein the Group 8-11 metal is selected from the group consisting of Ni, Fe, Co, or combinations thereof.

Clause 5. The process of any of Clauses 1-5, wherein the bimetallic nanoframe has an X-ray diffraction pattern having a diffraction peak at {111}, {200}, {220}, {311}, or combinations thereof.

Clause 6. The process of any of Clauses 1-6, wherein the bimetallic nanoframe comprises:
    an interior that is at least partially hollow; and
    a plurality of facets encapsulating the interior, each facet of the plurality of facets comprising metal atoms.

Clause 7. The process of Clause 6, wherein about 70% or more of the metal atoms are Pt.

Clause 8. The process of Clause 6, wherein about 85% or more of the metal atoms are Pt.

Clause 9. The process of any of Clauses 1-8, wherein:
    the bimetallic nanoframe, when supported on carbon, has a mass activity of greater than about 0.44 A/mg(Pt) at 0.9 V with a reference to a reversible hydrogen electrode ($V_{RHE}$);
    the bimetallic nanoframe, when supported on carbon, has a loss in mass activity, after 30,000 cycles, that is less than about 40% of its initial mass activity; or
    a combination thereof.

Clause 10. The process of any of Clauses 1-9, wherein the bimetallic nanoframe is a polyhedral nanoframe comprising a face-centered cubic nanoframe, a cubic nanoframe, a tetrahedral nanoframe, an octahedral nanoframe, a rhombic dodecahedral nanoframe, a decahedral nanoframe, an icosahedral nanoframe, a triangular prism nanoframe, a hexagonal prism nanoframe, a cuboctahedral nanoframe, a rod-shaped nanoframe, a bar-shaped nanoframe, a wire-shaped (or tube-like) nanoframe, or combinations thereof, as determined by X-ray diffraction.

Clause 11. The process of any of Clauses 1-10, wherein the second bimetallic structure and the acid are mixed at a temperature of about 10° C. to about 60° C.

Clause 12. The process of any of Clauses 1-11, wherein the acid comprises acetic acid, sulfuric acid, phosphoric acid, perchloric acid, or combinations thereof.

Clause 13. A catalyst composition, comprising:
a bimetallic polyhedral nanoframe, comprising:
an interior that is at least partially hollow; and
a plurality of facets encapsulating the interior, each facet of the plurality of facets comprising metal atoms, wherein the bimetallic polyhedral nanoframe has the formula:

$(M^1)_a(M^2)_b,$ wherein:
$M^1$ is Pt;
$M^2$ is a Group 8-11 metal comprising Fe, Ru, Os, Co, Rh, Ir, Ni, Pd, Cu, Ag, Au, or combinations thereof, and
a molar ratio of a:b is from about 99:1 to about 25:75.

Clause 14. The catalyst composition of Clause 13 further comprising a support.

Clause 15. The catalyst composition of Clause 13 or Clause 14, wherein:
the Group 8-11 metal of the bimetallic polyhedral nanoframe comprises Ni, Co, Pd, Au, Ag, or combinations thereof,
an X-ray diffraction pattern of the bimetallic polyhedral nanoframe has a diffraction peak at {111}, {200}, {220}, {311}, or combinations thereof; or
a combination thereof.

Clause 16. The catalyst composition of any of Clauses 13-15, wherein the bimetallic polyhedral nanoframe, when supported on carbon, has:
a mass activity of greater than about 0.44 A/mg(Pt) at 0.9 V with a reference to a reversible hydrogen electrode ($V_{RHE}$);
a loss in mass activity, after 30,000 cycles, that is less than about 40% of its initial mass activity; or
a combination thereof.

Clause 17. The catalyst composition of any of Clauses 13-16, wherein the bimetallic polyhedral nanoframe comprises a face-centered cubic nanoframe, a cubic nanoframe, a tetrahedral nanoframe, an octahedral nanoframe, a rhombic dodecahedral nanoframe, a decahedral nanoframe, an icosahedral nanoframe, a triangular prism nanoframe, a hexagonal prism nanoframe, a cuboctahedral nanoframe, a rod-shaped nanoframe, a bar-shaped nanoframe, a wire-shaped (or tube-like) nanoframe, or combinations thereof, as determined by X-ray diffraction.

Clause 18. The catalyst composition of any of Clauses 13-17, wherein about 70% or more of the metal atoms of the bimetallic polyhedral nanoframe are Pt packed in a face-centered cubic structure.

Clause 19. A process for forming a conversion product, comprising:
introducing a reactant to a bimetallic polyhedral nanoframe to form the conversion product, the bimetallic polyhedral nanoframe comprising:
an interior that is at least partially hollow; and
a plurality of facets encapsulating the interior, each facet of the plurality of facets comprising metal atoms, the bimetallic polyhedral nanoframe having the formula:

$(M^1)_a(M^2)_b,$ wherein:
$M^1$ is Pt;
$M^2$ is a Group 8-11 metal selected from the group consisting of Fe, Ru, Os, Co, Rh, Ir, Ni, Pd, Cu, Ag, Au, and combinations thereof, and
a molar ratio of a:b is from about 99:1 to about 25:75.

Clause 20. The process of Clause 19, wherein:
the bimetallic polyhedral nanoframe has an X-ray diffraction pattern having peaks at {111}, {200}, {220}, {311}, or combinations thereof,
the bimetallic polyhedral nanoframe, when supported on carbon, has a mass activity of greater than about 0.44 A/mg(Pt) at 0.9 V with a reference to a reversible hydrogen electrode ($V_{RHE}$);
the bimetallic polyhedral nanoframe, when supported on carbon, has a loss in mass activity, after 30,000 cycles, that is less than about 40% of its initial mass activity;
the bimetallic polyhedral nanoframe has a face-centered cubic structure as determined by X-ray diffraction;
about 70% or more of the metal atoms of each facet of the bimetallic polyhedral nanoframe are Pt; or
combinations thereof.

Aspects described herein generally relate to bimetallic structures (for example, bimetallic nanoframes) and syntheses thereof. The bimetallic structures described herein can be incorporated into catalyst compositions. The bimetallic structures, as well as compositions comprising such structures, can be utilized to increase the efficiency and catalytic activity in various conversion reactions.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, element, or elements and vice versa, e.g., the terms "comprising," "consisting essentially of," "consisting of" also include the product of the combinations of elements listed after the term.

The use of headings is for purposes of convenience only and does not limit the scope of the present disclosure.

As used herein, a "composition" can include component(s) of the composition, reaction product(s) of two or more components of the composition, and/or a remainder balance of remaining starting component(s). Compositions of the present disclosure can be prepared by any suitable mixing process.

As used herein, a "bimetallic structure" can include component(s) of the bimetallic structure, reaction product(s) of two or more components of the bimetallic structure, and/or a remainder balance of remaining starting component(s).

For the purposes of this present disclosure, and unless otherwise specified, the terms "hydrocarbyl radical," "hydrocarbyl group," or "hydrocarbyl" interchangeably refer to a group consisting of hydrogen and carbon atoms only. A hydrocarbyl group can be saturated or unsaturated, linear or branched, cyclic or acyclic, aromatic, or non-aromatic.

For the purposes of this disclosure, and unless otherwise specified, the term "aryl" refers to a hydrocarbyl group comprising an aromatic ring structure therein.

Chemical moieties of the application can be substituted or unsubstituted unless otherwise specified. "Substituted hydrocarbyl" and "substituted aryl" refer to a hydrocarbyl and an aryl in which at least one hydrogen has been substituted with at least one heteroatom or heteroatom-containing group, such as one or more elements from Group 13-17 of the periodic table of the elements, such as halogen (F, Cl, Br, or I), O, N, Se, Te, P, As, Sb, S, B, Si, Ge, Sn, Pb, and the like, such as C(O)R*, C(C)NR*$_2$, C(O)OR*, NR*$_2$, OR*, SeR*, TeR*, PR*$_2$, AsR*$_2$, SbR*$_2$, SR*, SO$_x$ (where x=2 or 3), BR*$_2$, SiR*$_3$, GeR*$_3$, SnR*$_3$, PbR*$_3$, and the like or where at least one heteroatom has been inserted within the hydrocarbyl or aryl such as one or more of halogen (Cl, Br, I, F), O, N, S, Se, Te, NR*, PR*, AsR*, SbR*, BR*, SiR*$_2$, GeR*$_2$, SnR*$_2$, PbR*$_2$, and the like, where R* is, independently, hydrogen, hydrocarbyl (for example, C$_1$-C$_{10}$), or two or more R* may join together to form a substituted or unsubstituted completely saturated, partially unsaturated, fully unsaturated, or aromatic cyclic or polycyclic ring structure.

Where isomers of a named molecule group exist (for example, n-butyl, iso-butyl, sec-butyl, and tert-butyl), reference to one member of the group (for example, n-butyl) shall expressly disclose the remaining isomers (for example, iso-butyl, sec-butyl, and tert-butyl) in the family. Likewise, reference to a named molecule without specifying a particular isomer (for example, butyl) expressly discloses all isomers (for example, n-butyl, iso-butyl, sec-butyl, and tert-butyl).

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise. For example, aspects comprising "a metal" include aspects comprising one, two, or more metals, unless specified to the contrary or the context clearly indicates only one metal is included.

While the foregoing is directed to aspects of the present disclosure, other and further aspects of the disclosure may be devised without departing from the basic scope thereof, and the scope thereof is determined by the claims that follow.

What is claimed is:

1. A process for forming a bimetallic nanoframe, comprising:
forming a first bimetallic structure by reacting a first precursor and a second precursor, the first precursor comprising a metal (M$^1$), the second precursor comprising a Group 8-11 metal (M$^2$), wherein M$^1$ is platinum (Pt), wherein M$^2$ is free of Pt;
reacting a third precursor comprising Pt with the first bimetallic structure at a temperature of about 80° C. to about 300° C. to form a second bimetallic structure, the second bimetallic structure having a higher molar ratio of Pt to Group 8-11 metal than that of the first bimetallic structure; and
introducing the second bimetallic structure with an acid to form the bimetallic nanoframe, the bimetallic nanoframe having a higher molar ratio of Pt to Group 8-11 metal than that of the second bimetallic structure, the bimetallic nanoframe having the formula:

$$(Pt)_a(M^2)_b,$$

wherein:
a is the amount of Pt;
b is the amount of M$^2$; and
a molar ratio of a:b is from about 99:1 to about 25:75.

2. The process of claim 1, wherein the Group 8-11 metal comprises Fe, Ru, Os, Co, Rh, Ir, Ni, Pd, Cu, Ag, Au, or combinations thereof.

3. The process of claim 1, wherein the Group 8-11 metal is selected from the group consisting of Ni, Fe, Co, Pd, Au, Ag, and combinations thereof.

4. The process of claim 1, wherein the Group 8-11 metal is selected from the group consisting of Ni, Fe, Co, and combinations thereof.

5. The process of claim 1, wherein the bimetallic nanoframe has an X-ray diffraction pattern having a diffraction peak at {111}, {200}, {220}, {311}, or combinations thereof.

6. The process of claim 1, wherein the bimetallic nanoframe comprises:
an interior that is at least partially hollow; and
a plurality of facets encapsulating the interior, each facet of the plurality of facets comprising metal atoms.

7. The process of claim 6, wherein about 70% or more of the metal atoms are Pt.

8. The process of claim 6, wherein about 85% or more of the metal atoms are Pt.

9. The process of claim 1, wherein:
the bimetallic nanoframe, when supported on carbon, has a mass activity of greater than about 0.44 A/mg(Pt) at 0.9 V with a reference to a reversible hydrogen electrode (V$_{RHE}$);
the bimetallic nanoframe, when supported on carbon, has a loss in mass activity, after 30,000 cycles, that is less than about 40% of its initial mass activity; or
both.

10. The process of claim 1, wherein the bimetallic nanoframe is a polyhedral nanoframe comprising a face-centered cubic nanoframe, a cubic nanoframe, a tetrahedral nanoframe, an octahedral nanoframe, a rhombic dodecahedral nanoframe, a decahedral nanoframe, an icosahedral nanoframe, a triangular prism nanoframe, a hexagonal prism nanoframe, a cuboctahedral nanoframe, a rod-shaped nanoframe, a bar-shaped nanoframe, a wire-shaped (or tube-like) nanoframe, or combinations thereof, as determined by X-ray diffraction.

11. The process of claim 1, wherein the second bimetallic structure and the acid are mixed at a temperature of about 10° C. to about 60° C.

12. The process of claim 1, wherein the acid comprises acetic acid, sulfuric acid, phosphoric acid, perchloric acid, or combinations thereof.

13. A process for forming a bimetallic nanoframe, comprising:
forming a first bimetallic structure by reacting a first precursor and a second precursor, the first precursor comprising a metal (M$^1$), the second precursor comprising a Group 8-11 metal (M$^2$) selected from the group consisting of Ni, Fe, Co, Pd, Au, Ag, and combinations thereof, wherein $M^1$ is platinum (Pt), and wherein $M^2$ is free of Pt;

reacting a third precursor comprising Pt with the first bimetallic structure at a temperature of about 80° C. to about 300° C. to form a second bimetallic structure, the second bimetallic structure having a higher molar ratio of Pt to Group 8-11 metal than that of the first bimetallic structure; and introducing the second bimetallic structure with an acid to form the bimetallic nanoframe, the acid comprising acetic acid, sulfuric acid, phosphoric acid, perchloric acid, or combinations thereof, the bimetallic nanoframe having a higher molar ratio of Pt to Group 8-11 metal than that of the second bimetallic structure, the bimetallic nanoframe having the formula:

$$(Pt)_a(M^2)_b,$$

wherein:
a is the amount of Pt;
b is the amount of $M^2$;
a molar ratio of a:b is from about 99:1 to about 25:75.

14. The process of claim 13, wherein the Group 8-11 metal ($M^2$) is selected from the group consisting of Ni, Fe, Co, and combinations thereof.

15. The process of claim 13, wherein the bimetallic nanoframe has an X-ray diffraction pattern having a diffraction peak at {111}, {200}, {220}, {311}, or combinations thereof.

16. The process of claim 13, wherein the bimetallic nanoframe comprises:
an interior that is at least partially hollow; and
a plurality of facets encapsulating the interior, each facet of the plurality of facets comprising metal atoms.

17. The process of claim 16, wherein about 70% or more of the metal atoms are Pt.

18. A process for forming a bimetallic nanoframe, comprising:
forming a first bimetallic structure by reacting a first precursor and a second precursor, the first precursor comprising a metal ($M^1$), the second precursor comprising a Group 8-11 metal ($M^2$) selected from the group consisting of Ni, Fe, Co, Pd, Au, Ag, and combinations thereof, wherein $M^1$ is platinum (Pt), and wherein $M^2$ is free of Pt;

reacting a third precursor comprising Pt with the first bimetallic structure at a temperature of about 80° C. to about 300° C. to form a second bimetallic structure, the second bimetallic structure having a higher molar ratio of Pt to Group 8-11 metal than that of the first bimetallic structure; and introducing the second bimetallic structure with an acid and mixing the resultant mixture at a temperature of about 10° C. to about 60° C. to form the bimetallic nanoframe, the bimetallic nanoframe having a higher molar ratio of Pt to Group 8-11 metal than that of the second bimetallic structure, the bimetallic nanoframe having the formula:

$$(Pt)_a(M^2)_b,$$

wherein:
a is the amount of Pt;
b is the amount of $M^2$;
a molar ratio of a:b is from about 99:1 to about 25:75.

19. The process of claim 18, wherein the Group 8-11 metal ($M^2$) is selected from the group consisting of Ni, Fe, Co, and combinations thereof.

20. The process of claim 18, wherein the bimetallic nanoframe comprises:
an interior that is at least partially hollow; and
a plurality of facets encapsulating the interior, each facet of the plurality of facets comprising metal atoms.

* * * * *